United States Patent [19]
Maltman et al.

[11] 4,001,476
[45] *Jan. 4, 1977

[54] MANUFACTURE OF FLOAT GLASS
[75] Inventors: William Ramsey Maltman, Prescot; Colin Robert Howard, Liverpool, both of England
[73] Assignee: Pilkington Brothers Limited, Liverpool, England
[*] Notice: The portion of the term of this patent subsequent to Nov. 26, 1991, has been disclaimed.
[22] Filed: Aug. 20, 1974
[21] Appl. No.: 498,927

Related U.S. Application Data
[62] Division of Ser. No. 287,716, Sept. 11, 1972, Pat. No. 3,850,605.

[30] Foreign Application Priority Data
Sept. 17, 1971 United Kingdom........... 43507/71

[52] U.S. Cl. .................. 428/209; 65/30 E; 65/99 A; 65/182 R; 204/15; 204/30; 428/195; 428/212; 428/218; 428/410; 428/433; 428/434
[51] Int. Cl.² ................ C03B 18/02; C03C 21/00; B32B 15/08; B32B 17/06
[58] Field of Search .......... 161/1, 6, 3, 166, 196, 161/413; 65/30, 99 A, 187 R; 204/219, 284, 285, 130, 15, 30; 428/410, 433, 434, 212, 218, 208, 195, 209

[56] References Cited
UNITED STATES PATENTS

| | | | |
|---|---|---|---|
| 3,420,698 | 1/1969 | Smith | 117/124 |
| 3,424,567 | 1/1969 | Smith | 65/30 R |
| 3,495,963 | 2/1970 | Buckley | 161/1 |
| 3,502,022 | 3/1970 | Wood | 65/30 |
| 3,647,407 | 3/1972 | Robinson | 65/99 A |
| 3,652,244 | 3/1972 | Plumat | 65/30 |
| 3,666,540 | 5/1972 | Burnett | 161/196 |
| 3,741,741 | 6/1973 | Ohsato | 204/130 |
| 3,775,154 | 11/1973 | Greg | 65/33 |
| 3,790,360 | 2/1974 | Kato | 65/30 |
| 3,892,904 | 7/1975 | Tanaka | 428/429 |

OTHER PUBLICATIONS
Weyl, Woldemar, "Coloured Glasses" pp. 183, 184, 1967, Sheffield, England.
Weyl, Woldemar, "Coloured Glasses" pp. 57–63, 1967, Sheffield, England.

*Primary Examiner*—George F. Lesmes
*Assistant Examiner*—Ellis P. Robinson
*Attorney, Agent, or Firm*—Burns, Doane, Swecker & Mathis

[57] ABSTRACT

Patterned float glass is manufactured by locating in contact with the float ribbon, while it is hot, a shaped molten body of a material for modifying the glass surface. The configuration of the molten body is progenitive of a pattern to be introduced into the glass and ionic migration is engendered electrically between the molten body and the glass in a sequence of defined time periods to produce a pattern of modified glass in the ribbon surface.

36 Claims, 26 Drawing Figures

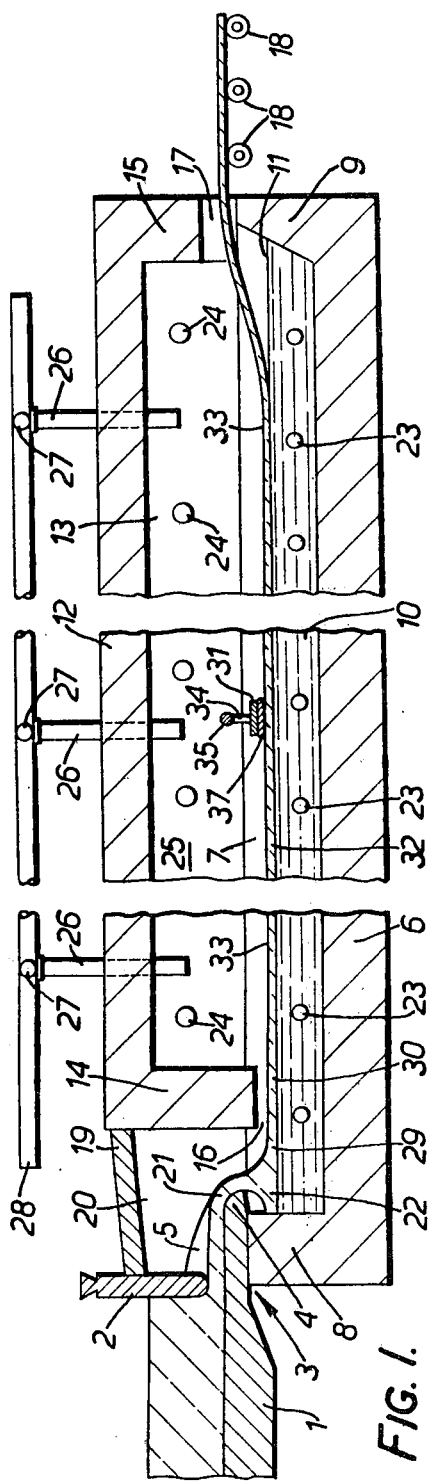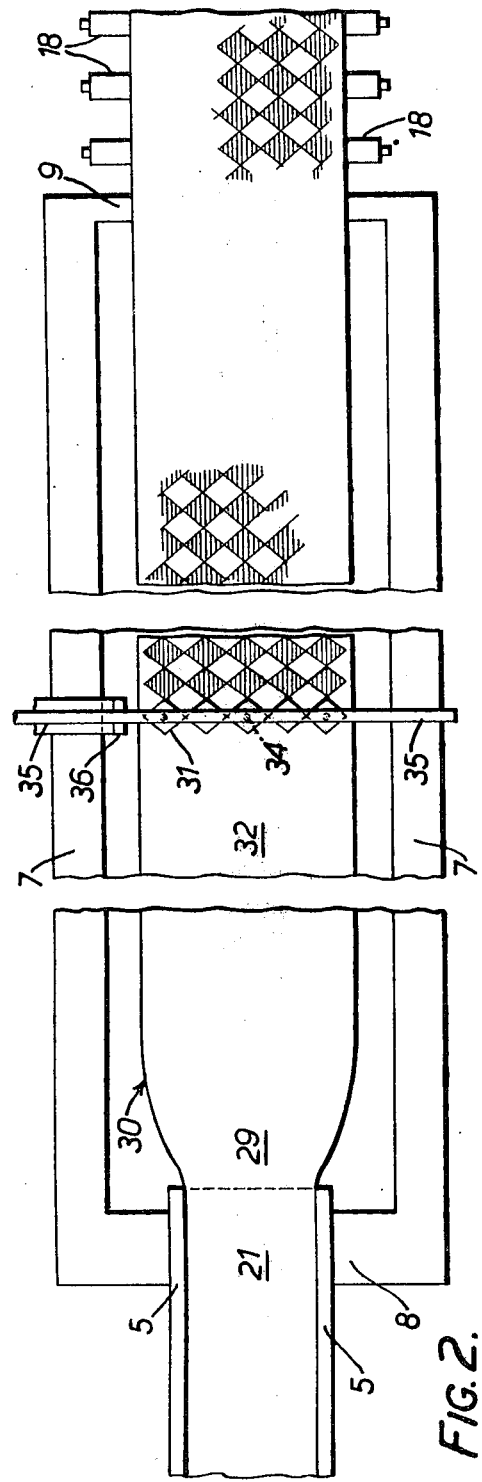

MANUFACTURE OF FLOAT GLASS

This is a division of application Ser. No. 287,716 filed Sept. 11, 1972, now U.S. Pat. No. 3,850,605, issued Nov. 26, 1974.

BACKGROUND OF THE INVENTION

1. FIELD OF THE INVENTION

This invention relates to the manufacture of patterned glass.

2. DESCRIPTION OF THE PRIOR ART

Glass manufacturing methods are known in which a metallic or coloured surface appearance is imparted to a glass surface by ionic migration of one or more metals from a molten metal body in contact with the glass surface to be treated, under the influence of a controlled electric current passing from the molten body into the glass. Surface modified float glass has been produced in this way.

Usually the molten metal body is located on the upper surface of an advancing ribbon of glass by clinging to the underface of an electrically conductive locating member fixed above the upper surface of the ribbon. The configuration of the underface of the locating member determines the configuration of the molten metal body. By maintaining a rectangular elongated form for the molten metal body uniform treatment of the ribbon surface across its whole usable width is achieved.

Shaded characteristics, transversely of the ribbon, have been produced, for example for the manufacture of glass for shaded windscreens, by using a shaped locating member tapering from the centre towards the ends of the member so that the molten metal body clinging to the underface of that member has a larger dimension, in the direction of ribbon advance, at the centre of the ribbon than at the margins of the ribbon.

It has also been proposed to produce shaded characteristics longitudinally of a ribbon of glass advancing along a molten metal bath by continuously varying the voltage applied to the molten metal body and so continuously varying the intensity of surface modification of the glass.

It is a main object of the present invention to develop these techniques for the production of patterned glass, particularly patterned float glass, having a decorative pattern introduced into a surface of the glass.

SUMMARY

The invention provides a method of manufacturing patterened glass in which the glass is supported at a temperature at which it is electrically conductive, and there is located in contact with a surface of the glass a molten body of an electrically conductive material for modifying the glass, which is shaped to a configuration progenitive of a pattern to be introduced into the glass. Predetermined ionic migration is effected electrically between the molten body and the glass in a defined time period which is related to the speed of relative movement between the molten body and the glass, and produces in the glass surface a pattern element of modified glass which exhibits its derivation from the configuration of the molten body.

A repeated pattern is introduced into the glass surface by repeatedly engendering said ionic migration in a sequence of defined time periods.

One method of operating the invention is for continuously manufacturing patterned float glass in which a ribbon of glass is advanced along a molten metal bath. The shaped molten metal body is located on the upper surface of the ribbon, electrical connection is made to the molten metal body and to the bath and an electrical supply to the molten body is switched according to a switching sequence related to the ribbon speed.

The frequency of repetition of the pattern in the glass surface can be readily adjusted by adjusting the setting of the intervals between said time periods. Adjustability of the duration of each of the time periods during which migration takes place gives latitude for adjusting the definition of the pattern, in particular in relation to effects observed in that part of each pattern element introduced into the glass from the leading edge of the molten metal body.

In one way of operating the spacing of said defined time periods is at regular intervals such that an increment of glass surface accommodating a pattern element passes beneath the molten metal body during each of said intervals whereby the pattern element is repeatedly introduced contiguously into the glass surface.

Further the invention provides for spacing said defined time periods at regular intervals such that a number of said time periods occur during the passage beneath the molten metal body of an increment of glass surface accommodating the pattern element, whereby regularly overlapping pattern elements are introduced into the glass surface.

The invention further provides for spacing said time periods so that one said time period is preceded and succeeded by time intervals of different lengths to produce different spacing between successive pattern elements in the glass.

Preferably in each embodiment the molten metal body is shaped by clinging to the underface of a locating member extending across the path of said relative movement, the configuration of which underface is progenitive of the pattern.

In one example of operation of the invention the molten body is a body of copper/lead alloy clinging to the underface of a shaped copper bar.

In another example of operation the molten body is a body of indium clinging to the underface of a shaped iron bar.

The invention further comprises locating two said shaped molten bodies in contact with the glass surface and spaced apart from each other, and engendering ionic migration from each body into the glass for a defined time period, which time periods are so phased as to produce pattern elements at predetermined spaced positions in the glass surface.

Said time periods may be spaced by a time interval so related to the speed of said relative movement as to produce in the glass pattern elements spaced apart by a predetermined distance in the direction of said relative movement.

The molten bodies may be of the same or of different materials; and may be shaped to the same or different configurations.

The invention also provides apparatus for producing patterned glass comprising means for supporting the glass at a temperature at which it is electrically conductive, shaped locating means for locating on the glass a shaped molten body of electrically conductive material for modifying the glass, means for effective relative movement between the shaped locating means and the glass, and an electric supply circuit connected to the locating means and including switching means for switching an electric supply to the locating means according to a predetermined switching sequence.

Further the invention provides apparatus for producing patterned flat glass, comprising an elongated tank structure containing a bath of molten metal, means for delivering glass to the bath and advancing the glass in ribbon form along the bath at a controlled speed, a locating member mounted transversely of the bath adjacent the bath surface for locating on the upper surface of the ribbon a molten metal body capable of ionic migration into the glass surface, the underface of the locating member to which face the molten metal body clings being shaped to a configuration progenitive of a pattern to be introduced into the glass surface, and an electric current supply circuit connected to the locating member and to the bath and including regulated switching means for repeatedly switching electric current supplied to the locating member according to a predetermined switching sequence related to the ribbon speed to introduce an element of the pattern repetitively into the upper surface of the advancing glass.

In one embodiment the locating member is a metal bar whose underface is shaped as a series of end-to-end diamonds.

In another embodiment the locating member is a metal bar whose underface is shaped as a number of circles spaced apart by and joined by straight bridging pieces.

In yet another embodiment the locating member is a metal bar whose underface is shaped as a series of end-to-end octagons.

Further the locating member may be a metal bar whose underface is of zig-zag shape.

Still further the locating member may be an elongated metallic member whose underface is shaped as a series of open rectangles spaced apart by and joined by straight bridging pieces.

Further the locating member may be a metal bar whose underface is of crenellated shape.

The apparatus may comprise two shaped locating members which are spaced apart to locate two spaced molten bodies on the ribbon surface. The underface of the two locating members may be shaped to different configurations.

The invention further comprehends patterned glass having a surface concentration of colourant produced by electrolytic migration into that surface, which concentration varies according to a defined pattern.

The invention further comprehends a glass sheet in which, in at least one direction in the plane of the sheet, there is a cyclically repetitive pattern formed by zones of different light transmission properties each having a predetermined surface concentration of metal in the glass produced by electrolytic migration. The sheet may also have a cyclically repetitive pattern in the direction orthogonal to said one direction.

Different parts of the pattern may be of different colours as considered in respect of transmitted light. Preferably the pattern comprises distinguishable shapes of different transmission values and/or colours. The pitch of repetition may be equal to the corresponding dimension of a pattern element, e.g. a geometrical shape such as a circle, so that repetitions of the pattern element are contiguous, or may be less than the corresponding dimension of a pattern element so that repetitions of the element overlap, or may be greater than the corresponding dimension of the pattern element so that repetitions of the element are spaced apart.

The pattern may include at least two pattern elements of different shapes.

BRIEF DESCRIPTION OF THE DRAWINGS

FIG. 1 is a sectional elevation of apparatus according to the invention, including a tank structure containing a bath of molten metal with a roof structure over the tank structure, means for delivering molten glass to the bath and a shaped locating member over the bath to which a molten metal body clings and is thereby located on the upper surface of the ribbon of float glass, FIG. 2 is a plan view of the apparatus of FIG. 1 with the roof structure removed and showing in plan the shape of the locating member comprising a series of end-to-end diamonds.

DESCRIPTION OF THE PREFERRED EMBODIMENTS

Figure 3:
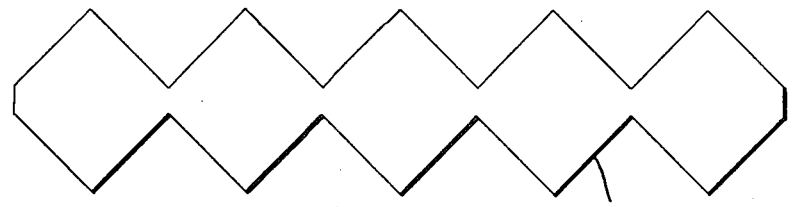
FIG. 3 is an enlarged plan view of a modified form of the shaped locating member of FIG. 1 and 2, comprising a series of end-to-end octagons.

Referring to FIGS. 1 and 2 of the drawings a forehearth of a continuous glass melting furnace is indicated at 1 and a regulating tweel at 2. The forehearth ends in a spout 3 comprising a lip 4 and side jambs 5 one of which is shown in FIG. 1. The lip 4 and side jambs 5 together constitute a spout of generally rectangular cross-section.

The spout 3 is disposed above the floor 6 of an elongated tank structure including side walls 7 joined together to form an integral structure with the floor 6, an end wall 8 at the inlet end of the tank, and an end wall 9 at the outlet end of the tank. The tank structure holds a bath of molten metal 10 whose surface level is indicated at 11. The bath is for example a bath of molten tin or of a molten tin alloy in which tin predominates and which has a specific gravity greater than that of the glass.

A roof structure is supported over the tank structure and the roof structure includes a roof 12, side walls 13 and integral end walls 14 and 15 respectively at the inlet and outlet ends of the bath. The inlet end wall 14 extends downwardly close to the surface 11 of the molten metal to define with that surface an inlet 16 which is restricted in height and through which molten glass is advanced along the bath.

The outlet end wall 15 of the roof structure defines with the outlet end wall 9 of the tank structure an outlet 17 through which the ultimate ribbon of glass produced on the bath is discharged onto driven conveyor rollers 18 mounted outside the outlet end of the tank structure and disposed somewhat above the level of the top of the end wall 9 of the tank structure so that the ribbon is lifted clear of the wall 9 for discharge through the outlet 17.

The rollers 18 convey the ultimate ribbon of glass to an annealing lehr in well known manner and also apply tractive effort to the ribbon of glass to assist in advancing the ribbon as it glides along the surface of the bath 10.

An extension 19 of the roof structure extends up to the tweel 2 and forms a chamber having side walls 20 in which the spout 3 is disposed.

Molten soda-lime-silica glass 21 is poured onto the bath 10 of molten metal from the spout 3 and the tweel 2 regulates the rate of flow of the molten glass 21 over the spout lip 4 to form a layer of molten glass on the bath.

The temperature of the glass as it is advanced along the bath is regulated from the inlet end, where the temperature is usually about 1050° C, down to the discharge end, where the temperature is usually about 659° C, by temperature regulators 23 immersed in the bath 10 and temperature regulators 24 mounted in the headspace 25 defined by the roof structure over the bath. A protective gas is supplied to the headspace through ducts 26 which are provided at intervals in the roof 12. The ducts 26 are connected by branches 27 to a header 28 which is connected to a supply of protective gas and preferably the protective gas contains a reducing constituent for example the protective atmosphere may consist of 10% hydrogen and 90% nitrogen.

A plenum of the protective gas is maintained in the substantially closed headspace, and there is outward flow of protective gas through the inlet 16 and the outlet 17 from the headspace.

The temperature of the molten glass delivered to the bath is regulated by the temperature regulators 23 and 24 as the glass is advanced along the bath so as to ensure that the layer of molten glass 29 is established on the bath. This layer 29 is advanced through the inlet 16 and during this advance there is unhindered lateral flow of the molten glass to develop on the bath surface from the layer 29 a buoyant body 30 of molten glass which is then advanced in ribbon form along the bath. The width of the tank structure at the surface level of the bath is greater than the width of the buoyant body 30 of molten glass so that there is no limitation to the initial free lateral flow of the molten glass.

A shaped bar electrode 31 is mounted transversely of the tank structure just above the path of travel of the upper surface of the ribbon of glass 32 which is developed from the buoyant body 30. A gap, for example about 6 mm high, exists between the underface of the bar 31 and the upper surface 33 of the ribbon. The bar 31, in the embodiment of FIGS. 1 and 2, is a copper bar which is shaped as a series of end-to-end diamonds, and is maintained in position by struts 34 which suspend the bar from an overhead electrically conductive beam 35 which is fixed across the tank structure. Electrical connection is made to the bar 31 through the beam 35 and the struts 34 and electrical connection is made to the molten metal bath by an electrode 36 which dips into the bath alongside the path of travel of the ribbon of glass.

The shaped electrode bar 31 is located in the tank structure where the temperature of the glass ribbon is about 750° C, and acts as a locating member for a molten body 37, for example a body of molten copper/lead alloy, which clings to the shaped underface of the bar 31 and is suspended from that underface against the upper surface 33 of the ribbon. Under these conditions the copper/lead alloy consists of 2.5% copper and 97.5% lead.

The underface of the bar 31 shapes the molten metal body 37 to the configuration progenitive of a pattern to be introduced into the glass surface, in this example a series of end-to-end diamonds.

Other shaped bars are illustrated in FIGS. 3 to 9, each corresponding in plan to the characteristics of a pattern.

The underface of the metal bar of FIG. 3 is shaped as a series of end-to-end hexagons and is a modified form of the bar of FIGS. 1 and 2.

Figure 4:
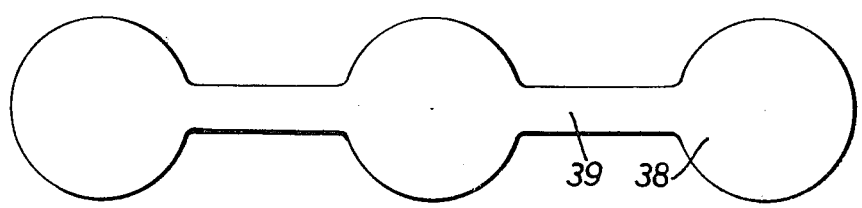
FIGS. 4 to 9 are plan views similar to FIG. 3 of other shaped locating members used for producing different patterns in the glass.

The metal bar of FIG. 4 whose underface is shaped as three circles 38 spaced apart and joined by straight bridging pieces 39.

Figure 5:
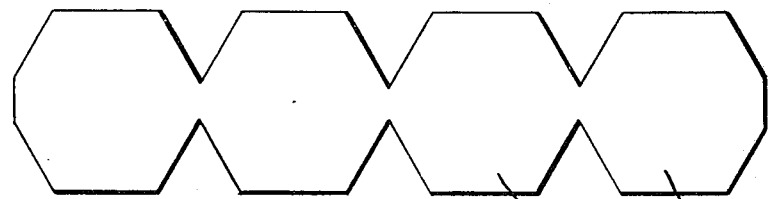
Figure 6:
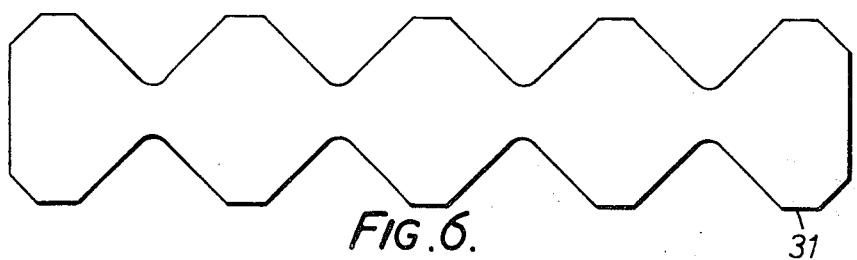
Figure 7:
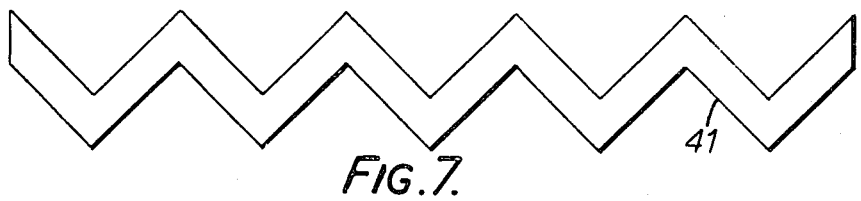
Figure 8:
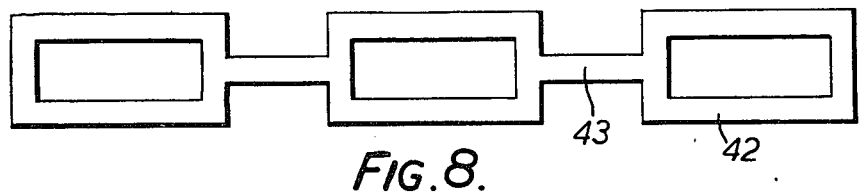

FIG. 5 illustrates the underface of a metal bar shaped as a series of end-to-end octagons 40, and FIG. 6 illustrates a slightly modified form of the shape of the underface of the bar of FIG. 5. FIG. 7 illustrates the underface of a metal bar 41 of zig-zag shape, and FIG. 8 a metal bar whose underface consists of three open rectangles 42 spaced apart and joined by straight bridging pieces 43.

Figure 9:
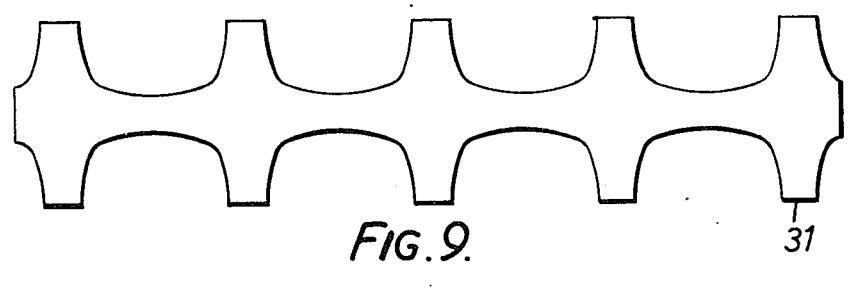

A bar whose underface is of crenellated shape is illustrated in FIG. 9.

In the examples to be described the electrical connection of a switched electric current supply circuit to the bar 31 is such that the bar is anodic during defined time periods of supply of current so that electric current flows from the shaped molten body 37 through the ribbon of glass into the supporting molten metal bath thereby enforcing ionic migration, for example of copper and lead ions, into the upper surface of the ribbon.

Figure 10:
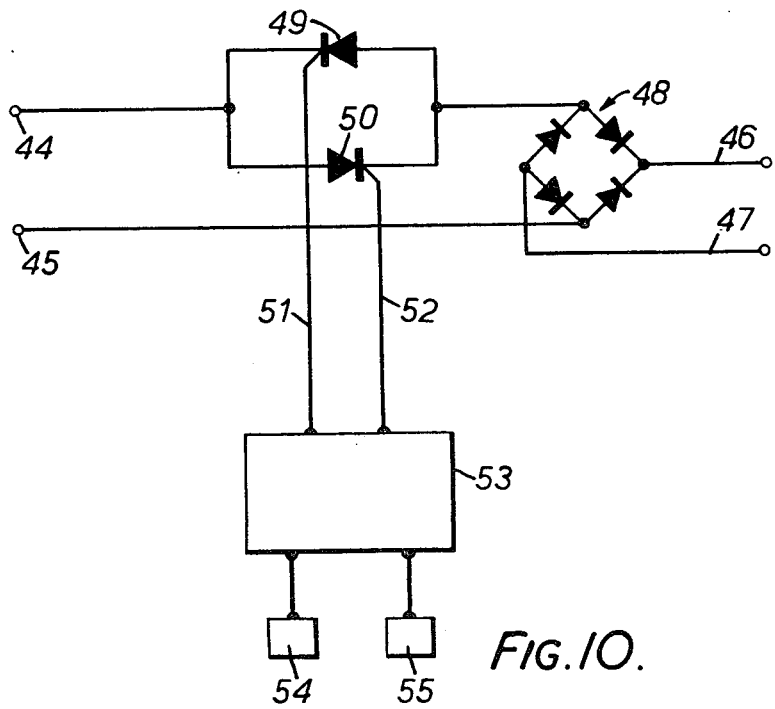
FIG. 10 is a simplified block diagram of a swtiched electric current supply circuit for connection to the bath and the molten metal body.

FIG. 10 illustrates simply the nature of the switched electric current supply circuit which has live and neutral input terminals 44 and 45 which are respectively connected to the live and neutral lines of an isolated mains A.C. supply at a frequency of 50 Hz.

The circuit has a positive output terminal 46 which is connected to the beam 35, and a negative output terminal 47 which is connected to the electrode 36 which dips into the molten metal bath.

The live input terminal 44 is connected to a full-wave rectifier bridge 48 through switching means comprising a thyristor circuit comprising two parallel-connected high current thyristors 49 and 50 which are respectively connected in a sense to conduct on the positive and negative half-cycles of the A.C. supply.

The trigger electrodes of the thyristors 49 and 50 are respectively connected by lines 51 and 52 to a thyristor firing circuit 53 of conventional kind for generating repeated bursts of firing pulses synchronised to the A.C. supply and each including a number, which may only be one, determined in a manner to be described, of pulses occurring at the commencement of successive half cycles of the A.C. supply. The circuit 53 includes a blocking oscillator for ensuring the existence in each thyristor firing pulse of a plurality of peaks thereby ensuring firing of the appropriate thyristor by each firing pulse.

The thyristor firing circuit 53 includes manual controls indicated at 54 and 55 for setting the "ON" time of firing of the thyristors, that is the defined time period when electric current, that is the supply of full wave rectified A.C., is switched on and supplied to the shaped locating bar 31, and for setting the "OFF" time of the thyristors, that is the time interval between successive defined time periods for the connection of the current supply to the bar 31. These controls are described in greater detail with reference to FIGS. 12 to 15.

Figure 11:
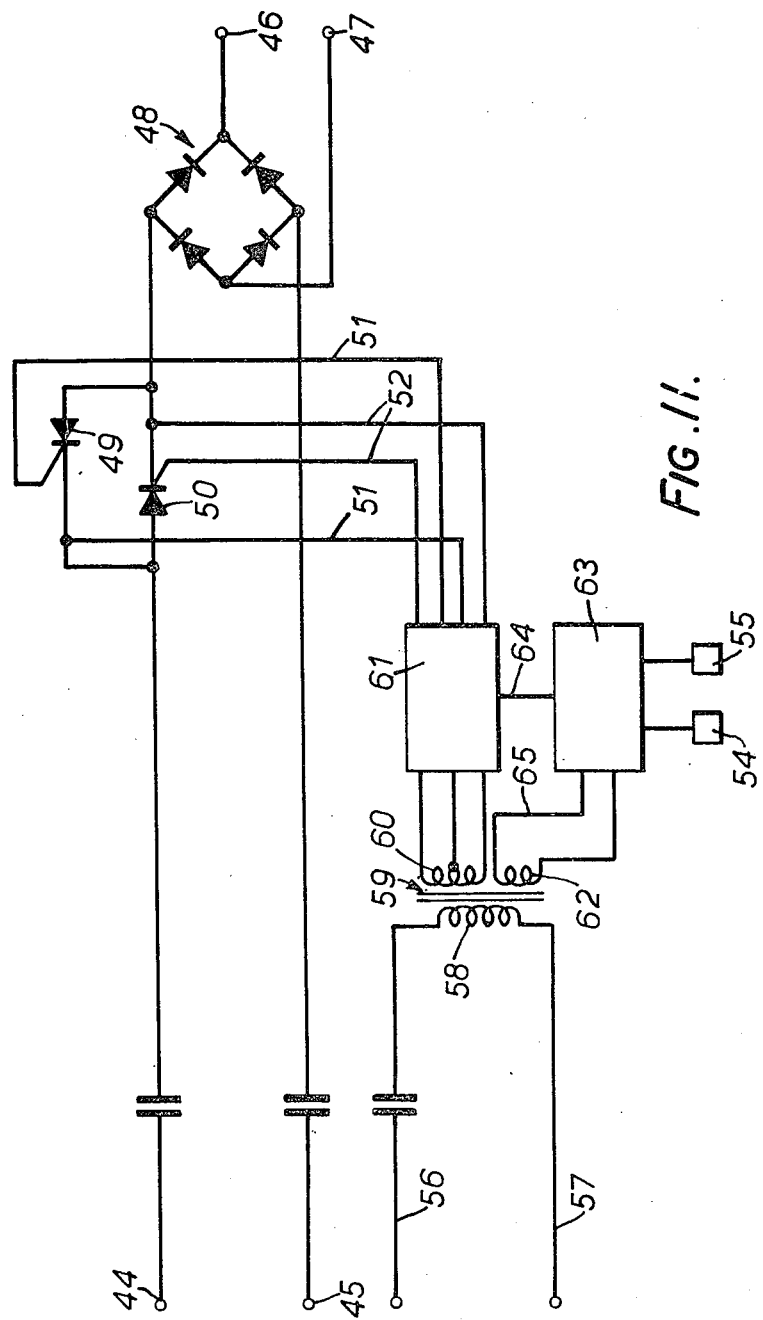
FIG. 11 is a more detailed layout of the supply circuit of FIG. 10.

The thyristor-controlled current supply circuit is shown in more detail in FIG. 11, which has a mains input on lines 56 and 57 to the primary winding 58 of an input transformer 59. The lines 56 and 57 are connected to a separate 50 Hz mains supply which is in phase with the supply connected to the terminals 44 and 45. A centre-tapped secondary winding 60 of the transformer 59 is connected to a blocking oscillator circuit 61 which forms part of the thyristor firing circuit 53 and is operable to produce thyristor firing pulses for supply on the lines 51 and 52 across the trigger electrodes and cathodes of the thyristors 49 and 50.

Figure 12:
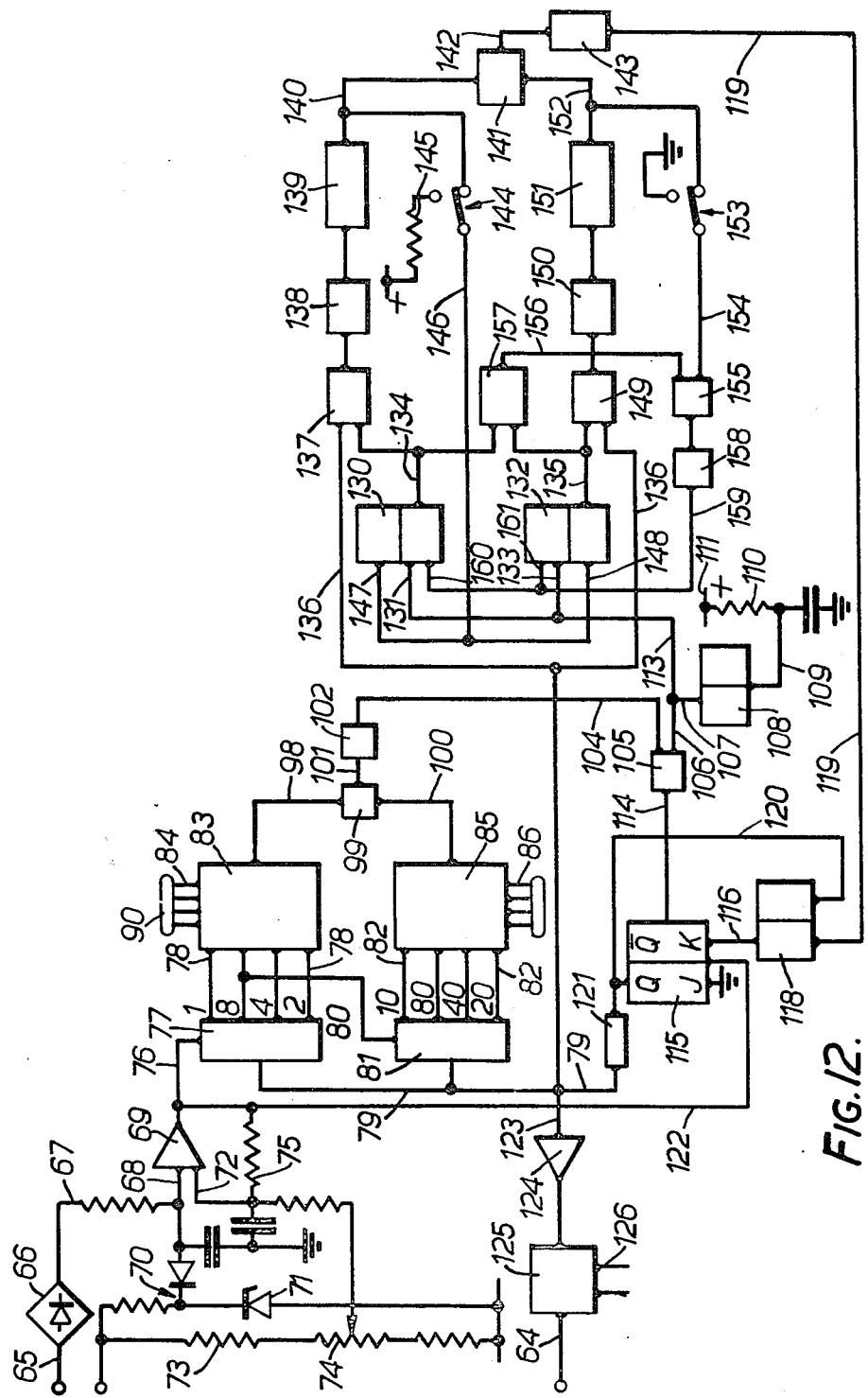
FIG. 12 is a circuit diagram mostly in block form of a control pulse generator circuit for generating control pulses for the switched electric current supply circuit.
Figure 13:
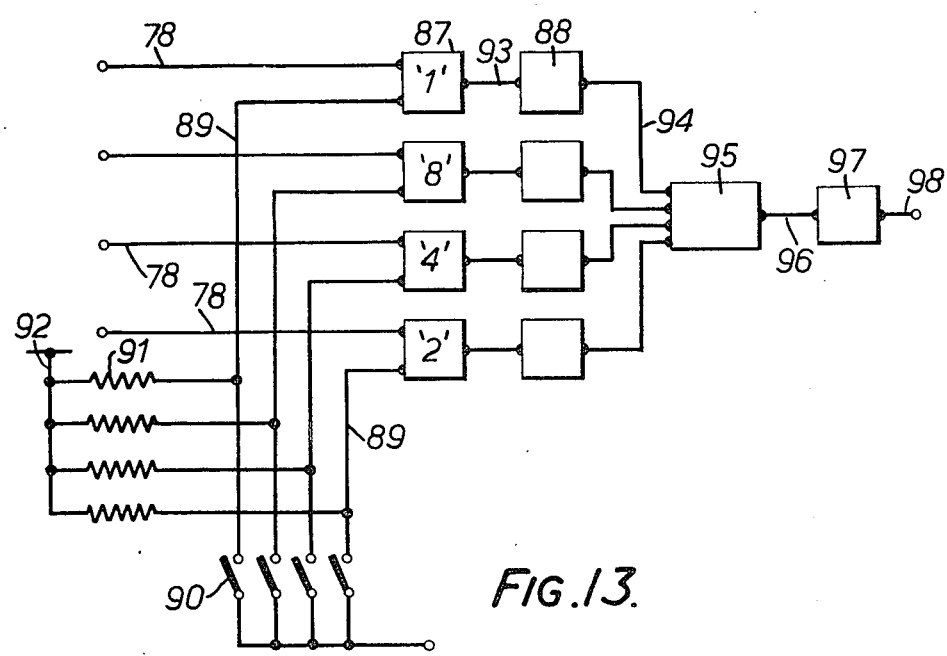
FIG. 13 is a detailed logic diagram of parts of the circuit of FIG. 12.
Figure 14:
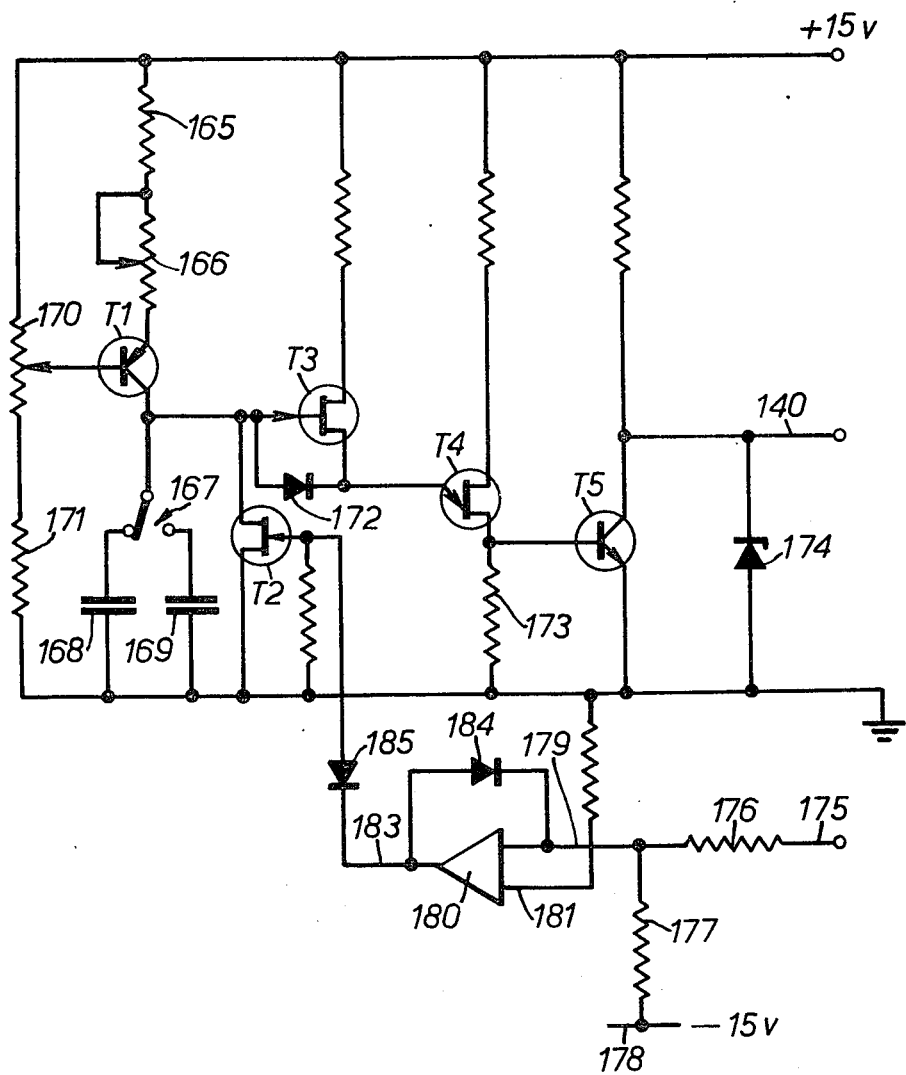
FIG. 14 is a detailed circuit diagram illustrating timer elements forming parts of the circuit of FIG. 12.

A further secondary winding 62 on the transformer 59 is connected to a control pulse generator circuit 63 which is illustrated in greater detail in FIGS. 12, 13 and 14, and also forms part of the thyristor firing circuit 53. The manual controls for setting the operation of the supply circuit are again indicated at 54 and 55 in FIG. 11.

A series of bursts of control pulses is fed on an output line 64 from the control pulse generator circuit 63 to the input of the blocking oscillator circuit 61. The thyristors 49 and 50 conduct in alternate half cycles of the A.C. supply for the duration of each time period defined by a burst of control pulses on line 64 to transmit in each time period a burst of alternating current to the rectifier bridge 48 whose output is a full wave rectified form of that burst of alternating current for transmission to the bar 31. Each burst of full wave rectifier current consists of as many half cycles as there are control pulses in the burst of control which defines the time period.

The control pulse generator circuit 63 is illustrated in greater detail in FIG. 12. A line 65 connected to one end of the secondary winding 62, FIG. 11, of transformer 59, is connected to one input terminal of a further full wave rectifier circuit indicated at 66 in FIG. 12. The full-wave rectified output from the rectifier bridge 66 is transmitted on a line 67 to one input 68 of a standard integrated circuit 69 which is connected as a comparator. This circuit is a commercially available circuit identified as Fairchild μ A 710. A diode clipping circuit 70 is also connected to the input 68 and has the effect of clipping the peaks of the full-wave rectified signal input on line 67. In the preferred embodiment to suit a particular input requirement of the comparator circuit 69 the peak voltage of the full-wave rectified signal on line 67 is limited to a level of just over 3 volts. The diode clipping circuit 70 includes a Zener diode 71 which stabilises the clipping level. The second input 72 to the comparator circuit 59 is supplied with a voltage level which is derived from a resistor chain 73 comprising three resistors the central one of which has a sliding contact 74 which is adjusted to derive the required voltage level for the comparator circuit 69. A level of just less than 3 volts is applied to the input 72 in the particular embodiment described. A feed-back resistor 75 stabilises the operation of the circuit 69 whose output is a succession of pulses whose leading edges occur towards the end of each half cycle of the A.C. supply as the voltage on input 68 falls below the set voltage level applied to the input 72. The trailing edges of the pulses occur shortly afterwards as the voltage on input 68 increases again at the beginning of the next half cycle of the A.C. supply. The pulse width is regulated by the setting of the level supplied by potentiometer 74 to the input 72 of the circuit 69, and the pulse repetition frequency is twice that of the A.C. supply so that pulses recur at 10 m sec. intervals. These pulses are transmitted on line 76 connected to the output from the circuit 69 and constitute clock pulses for timing the operation of the apparatus. These clock pulses are fed on line 76 to the input of a decade counter 77 which is composed on four standard integrated circuit binary-coded decade counter units and has four outputs on lines 78 respectively indicative of digits 1, 8, 4 and 2. An enabling input is connected to the counter 77 on line 79. The counter 77 acts as a "units" counter and a carry output from the output line 8 is connected by a carry line 80 to the input of a second similar decade counter 81 which operates as a "tens" counter and also has four outputs on lines 82 indicative of the numbers 10, 80, 40 and 20. The enabling input on line 79 is also connected to the counter 81.

The output lines 78 from the counter 77 are connected to a parity circuit 83 which will be described in greater detail with reference to FIG. 13 and which also has four inputs representing digits 1, 8, 4 and 2 on lines 84 connected to a thumb wheel switch which is manually operated to set up the units digit of the required setting of each time period of switching on the electric supply to the electrode bar 31 measured in terms of 10 ms units derived from the clock pulses on line 76.

A similar parity circuit 85 is connected to the output lines 82 from the tens counter 81 and also has four further inputs on lines 86 from a further thumb wheel switch which is manually operable to set in the tens digit of the number representing the aforementioned time period.

The units parity circuit 83 is illustrated in greater detail in FIG. 13 and comprises four channels each consisting of an exclusive OR gate 87 and a logic inverter circuit 88. The exclusive OR gates 87 are numbered 1, 8, 4 and 2 to indicate the binary value of the channel as appropriate. Each of the gates 87 have an input connected to one of the output lines 78 from the "units" counter 77. The second input to each of the exclusive OR gates is connected by a line 89 to a switch 90 of the units thumb wheel switch. Each of the lines 89 is connected through a resistor 91 to a stabilised supply for example a 5 volt supply on a line 92. The operation of the exclusive OR gates 87 is such that when there is a 1 on one or other of the two input lines 78 and 89 there is a 1 output from the gate 87, but the output from the gate 87 goes to 0 when either there is a 0 input or a 1 input on both lines 78 and 89. The outputs from the gates 87 are connected by lines 93 to the inverters 88, each of which is operable to produce a 1 output for a 0 input on line 93 and a 0 output from a 1 input on line 93. The output from each inverter 88 is connected by a line 94 to NAND gate 95 which has four inputs on the lines 94. When there is a 1 input on each of the lines 94 the NAND gate 95 gives an 0 output on line 96. If any one of the inputs on line 94 is 0 the output from the NAND gate on line 96 is 1. This output is fed to a further logic inverter circuit 97 whose operation is similar to the inverter 88 and the output from the inverter 97 on line 98 is a 1 indicating parity between the state of the units counter 77 and the setting in the thumb wheel switch 90 when all four inputs to the NAND gates 95 are 1. The line 98 is connected to a further NAND circuit 99, FIG. 12, which has a second input on a line 100 which is the output line from the tens parity circuit 85 whose construction is identical to that of FIG. 13 and which produces a 1 output on line 100 when parity is attained between the state of the tens counter 81 and the setting of the tens thumb wheel switch. When there are coincident digits on lines 98 and 100 the number of clock pulses from line 76 counted by the counters 77 and 81 is equivalent to the number of the units set into the thumb wheel switches to determine the length of the time periods of energisation of the electrode bar 31 for effecting ionic migration from the molten body 37 into the upper surface of the glass to imprint a pattern into that surface.

A line 101 connects the output from the gate 99 to an inverter 102 whose output is connected by a line 104 to one input of a conventional OR gate 105. A second input on line 106 to the OR gate 105 is connected to an output 107 from a reset circuit which comprises a monostable circuit 108 which receives an input on line 109 from the junction of an RC circuit 110 which is connected between a D.C, voltage supply line 111 and earth. When the equipment is switched on voltage appears on line 111 and the exponential rise in the voltage at the junction of the RC circuit 110 as the capacitor of that circuit charges is transmitted on line 109 to the trigger input of the monostable circuit 108 which produces a rest pulse for transmission on line 107 when a predetermined level of the exponential rise on the input line 109 is achieved. This reset pulse, whose purpose is to achieve initial resetting of the certain circuits to a state required at the commencement of operation, is fed on line 106 to the OR gate 105 and on a line 113 which is connected to the reset inputs of two bistable circuits in a timer circuit as will be described.

The output from the OR gate 105 is on a line 114 which is connected to an inhibit circuit which produces an 0 output on inhibit line 79 when it is required to enable operation of the counters 77 and 81. The output on inhibit line 79 performs other functions as will be described.

When parity is achieved in the parity circuits 83 and 85 resulting in an output on line 104 to the OR gate 105 the signal level on the inhibit line 79 has to be switched to a 1 state to inhibit further operation of the counters 77 and 81 and the generation of this change in level on line 79 is by means of an inhibit circuit comprising a JK flip-flop circuit 115 the J input of which is earthed representing a 0 input while the K input is connected by a line 116 to 1 output of a conventional bistable circuit 118 which has 1 input on line 119 from a timer circuit as will be described, and a second input on line 120 which is connected back to the Q-output of the JK flip-flop 115. The Q output of the flip-flop 115 is also connected to the inhibit line 79 through a short delay circuit 121 producing for example a delay of about 1 microsecond.

Clock pulses are fed to the JK flip-flop on line 122 which is connected to the clock pulse line 76 being the output from the comparator circuit 69 and a further input to the flip-flop 115 is on the line 114 which is the output line from the OR gate 105 and is connected to the flip-flop 115 to supply thereto pulses which override the normal actuation of the flip-flop 115 by the clock pulses and the signals on the J and K input lines 122 and 116.

The response of the flip-flop 115 to clock pulses on line 122 depends on the states of the J and K inputs. In the present circuit the J input is always 0 and when the K input is also 0 there is no response to clock pulses. When the K input is 1 the flip-flop 115 responds to the next clock pulse and switches to a state in which the Q output is 0 if the flip-flop was not in that state already.

When the equipment is switched on a reset pulse generated by the reset circuit on line 106 passes through the OR gate to the override input of flip-flop 115 thus ensuring that the flip-flop is in the state in which it provides a 1 output at its Q output and thus on the inhibit line. The counters 77 and 81 are inhibited from operation by the level 1 on the inhibit line 79. In addition the bistable circuit 115 is switched to the state in which it gives a 0 output on line 116 to the K input of flip-flop 115.

The 1 level on inhibit line 79 is also applied, as will be described, on lines 136 to timer circuits whose operation is initiated by the change of the level on inhibit line 79 from 0 to 1 to start a timing operation which results in the generation of a pulse on line 119 at one of the selected time intervals after the change from 0 to 1 on the inhibit line 79. The pulse on line 119 switches the bistable circuit 118 back to the state in which there is 1 on line 116.

The next clock pulse on line 122 can then trigger the flip-flop 115 from its existing state in which the Q output is 1 to the state in which Q̄ is 1. The Q output turns to 0 giving a 0 level on the inhibit line 79 after the delay incurred in the delay circuit 21. This permits the counters 77 and 81 to begin counting as from the next clock pulse so that it and successive clock pulses are counted in the counters 77 and 81 until parity is reached, producing an output on line 104 which is transmitted through the OR gate 105 and on line 114 to the override input of the flip-flop 115 to turn the flip-flop back to the state in which the Q output is 1 thus giving a 1 output on inhibit line 79 which once again terminates operation of the counters. The inhibit line 79 is also connected by a line 123 to a buffer amplifier 124 whose output is connected to the input of a zero voltage crossover switching circuit 125 whose output is connected to the line 64 which transmits control pulses to the blocking oscillator circuit 61.

When the inhibit line 79 and thus the input via line 123 to the switching circuit 125 is at the 1 level clock pulses are not counted and no thyristor firing control pulse is generated. This corresponds to the state during the time intervals between succesive bursts of alternating current supplied to the electrode bar 31. After the voltage level on the inhibit line 79 has changed to 0 and counting has begun the input to the switching circuit 125 also turns to 0. Alternating current from a further secondary winding, not shown, on the transformer 59 is supplied to the switching circuit 125 on lines indicated at 126. Once the input to the circuit 125 has turned to 0 level there is a pulse output on line 64 at the first negative going cross-over of the alternating current, that is as the positive half-cycle ends and the negative half cycle begins, and thereafter at each cross-over point of the alternating current a pulse of about 0.3 ms duration is generated on line 64 to generate a burst of control pulses which terminates when the input to the switching circuit 125 returns to 0 level. Each burst of control pulses may be one or several control pulses depending on the settings of the timer circuits and is transmitted on line 64 to the blocking oscillator circuit 61 which produces as already described a succession of spikes in its output, for example 5 spikes within each pulse on line 64 in order to ensure that both the thyristors 49 and 50 fire as appropriate in each cycle of the alternating current supply when current is being switched on to line 46 for supply to the electrode bar. The zero voltage cross-over switching circuit 125 is a conventional integrated circuit design manufactured by General Electric and will not be further described.

Thus once the level on the inhibit line 79 has turned to 0 counting of clock pulses begins and at the same time the switching of a succession of 10 ms half cycles of alternating current on to line 46 begins and continues until the appropriate number of those half cycles has been counted by the counters 77 and 81 which number of half cycles is set into the thumb wheel switches, the setting of which controls the length of the time period during which feeding of current to the electrode bar continues.

As well as providing the control just described for the time period in which current is supplied to the electrode bar there is facility for timing and regulating the interval between successive pulses and the timer circuits for effecting this is illustrated partly in FIG. 12 and partly in greater detail in FIG. 14.

Figure 15:
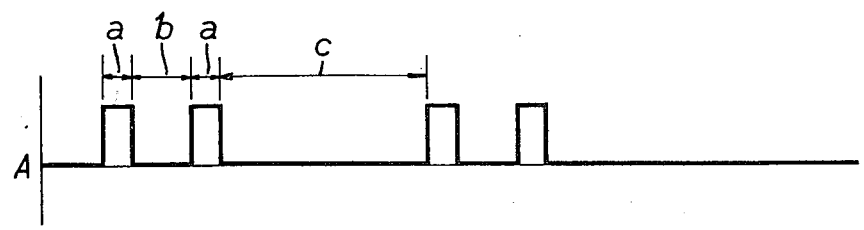
FIG. 15 is a waveform diagram illustrating the switching of the electric current supply from the circuit of FIG. 10.

Referring first to FIG. 15 this shows a wave-form which could be employed in operation of the circuits just described with reference to FIGS. 12 and 13 which operate to determine the time period of supply of current to the electrode bar which is shown in the waveform A of FIG. 13 as an effective pulse width $a$. Each of the pulses are of the same pulse width $a$ which is determined by the setting of the thumb wheel switches, but the time interval $b$ between the first two pulses is much shorter than the time interval $c$ between the second and third pulses. The time intervals $b$ and $c$ may be the same or different and regulation of the time intervals $b$ and $c$ will now be described.

The timer circuits for determining the intervals $b$ and $c$ are illustrated at the right hand side of FIG. 12 and there are two channels which can be set each channel determining one of the different time intervals. The first channel comprises a bistable circuit 130 of conventional design which has a reset input 131 connected to the reset pulse line 113. A similar bistable circuit 132 of the second channel has a reset input 133 also connected to the reset pulse line 113. The reset pulse on line 113 sets bistable circuit 130 to a condition in which its output on line 134 is 1 and sets bistable 132 to a condition in which output on line 135 is 0. This occurs at the commencement of operation when a reset pulse is generated in the reset circuit including monostable circuit 108. The inhibit line 79 is connected by a line 136 to one input of a NAND gate 137 whose second input is connected to the output 134 from the bistable circuit 130. The output from the NAND gate 137 is connected through a logic inverter 138 to the input of an adjustable timer circuit 139 which will be described in greater detail with reference to FIG. 14. The output from the timer circuit 139 is on line 140 which is connected to a common NAND gate 141 which has an output on line 142 connected through a logic inverter circuit 143 to line 119 which is connected to one input of the bistable circuit 118 in the inhibit circuit. The output line 140 from the timer 139 is also connected to one pole of a manually operable switch 144 which has a second pole connected through a resistor 145 to a positive voltage supply. Normally the switch is in the position illustrated and the movable contact of the switch 144 is connected by a line 146 to one trigger input 147 of the bistable circuit 130 and the trigger input 148 for the other state of the bistable circuit 132. The inhibit line is also connected by line 136 to a NAND gate 149 which has a second input connected to the output line 135 from the bistable circuit 132. The output from the NAND gate 149 is connected through a logic inverter 150 to a second timer circuit 151 of the same design as the circuit 139 and therefore also as illustrated in FIG. 14. The output from the second timer circuit 151 is on a line 152 which is connected to the second input to the common NAND gate 141 and is also connected to one pole of a second switch 153. The other pole of the switch 153 is earthed as shown and the switch is normally in the position as shown. The movable contact of the switch 153 is connected by line 154 to a further NAND gate 155 having a second input on line 156 which is connected to the output of an exclusive OR gate 157 whose two inputs are respectively connected to the outputs 134 ad 135 of the two bistable circuits 130 and 132.

The output from the NAND gate 155 is connected through a further logic inverter circuit 158 to a line 159 which is connected to the second trigger input 160 of the bistable circuit 130 and to the second trigger input 161 of the bistable circuit 132.

At the end of a time period of feeding the full wave rectified alternating current from the output 46 to the electrode bar 31 the timing of the interval $b$ commences. The generation of an inhibit level corresponding to 1 on inhibit line 79 is fed through to NAND gate 137 on line 136 which gate is already receiving a 1 input from a bistable circuit output 134 resulting from the reset conditions of that circuit.

With two 1 inputs to the NAND gate 137 the output becomes 0. This is inverted to give a 1 input to the timer 139 to commence operation of that timer.

As will be described with reference to FIG. 14 the timer 139 is basically an RC circuit operating through a transistor to give a short output pulse at a preset and adjustable time after the generation of an input signal by the inverter 138 which preset time corresponds to the time interval b between adjacent pulses. The output pulse on line 140 is negative-going, that is the normal 1 level on line 140 goes to 0 for a short period and thus passes through the NAND gate 141 there being at that time the normal 1 level on line 152, and is inverted by the inverter 143 and fed on line 119 as a negative-going pulse to trigger the bistable circuit 118 and reverse its state thereby transmitting one signal to the K input of the flip-flop 115 and giving rise to the generation of a 0 level on the inhibit line 79 on receipt of the next clock pulse on line 122 which zero level enables the counters 77 and 81 and causes the generation of the required number of control pulses for feeding as a burst of pulses on line 64 to the blocking oscillator circuit 61 at the commencement of the second time period which is indicated by the second pulse in the waveform A.

At the same time the pulse output from the timer 139 is passed though the switch 144 on line 146 to trigger inputs 147 and 148 of bistable circuits 130 and 132 reversing the state of those circuits so that the output 134 of bistable circuit 130 is switched to 0 and the output 135 of bistable circuit 132 is switched to 1.

The two bistable circuits 130 and 132 remain in this state throughout the next time period a until parity between the count of the counters and the setting of the thumb wheel switches is again reached and an output is transmitted on line 104 from the parity circuits. When that output is transmitted the inhibit circuit again operates to switch the level of the inhibit line 79 to 1. This change of level is transmitted on line 136 to the NAND gate 137, producing no effect because of the 0 level of the input to that gate from output 134 but co-operating in the NAND gate 149 which already has a 1 input from the output 135 to produce a 0 level output which is inverted by the circuit 150 ad transmitted as a 1 level to the second timer 151 which is operable after a preset time corresponding to the time interval c between the second and third pulses shown in the waveform to produce a further negative-going pulse which is then fed through the NAND gate 141 which at that time has a 1 input on line 140 and inverter 143 to trigger the inhibit circuit to cause again a change in level of the inhibit line 79.

The output pulse from timer 151 on line 152 is also passed through the switch 153 on line 154 to the NAND gate 155 which also receives a 1 input on line 156 during normal operation since one and only one of the outputs 134 and 135 connected to the exclusive OR gate 157 should normally be at level 1. As long as that is so, the negative-going pulse on line 154 will produce a positive-going pulse from NAND gate 155 which is inverted by inverter 158 and provides a negative-going switching trigger pulse on line 159. This is applied to inputs 160 and 161 of the bistable circuits 130 and 132 to switch them back to their initial state in which there is a 1 output on line 134 and a 0 output on line 135.

If the two bistable circuits 130 and 132 are both in the same condition due to mis-operation, for example by a stray pulse, at the commencement to operation, the exclusive OR gate 157 has a 0 output which results in the production of a 0 level on line 159 which ensures that the circuits 130 and 132 are set to their required initial state. This level is removed when the circuits 130 and 132 are reset.

The timer circuits 139 and 151 are both as illustrated in FIG. 14. A uni-junction transistor T4 co-operates with a circuit having a time constant regulated by resistors 165 and 166, which are connected in series, and one of capacitors 168 and 169 selected by a switch 167. The reistor 166 being adjustable. The series connected resistors 165 and 166 are connected through a transistor T1 to the movable contact of the switch 167 which has two fixed contacts to which there are respectively connected the capacitors 168 and 169 of different values. For example the capacitor 168 may be $1\mu f$ while the capacitor 169 is $10\mu f$ in value. Operation of the switch 167 thereby provides a coarse adjustment of the time constant while adjustment of the slider on the resistor 166 gives a fine adjustment.

The base of the transistor T1 is connected to a slider on a potentiometer 170 which is connected in series with a further resistor 171 across the supply circuit. The base level of the transistor T1 is adjustable and the transistor T1 with its resistors 170 and 171 ad with the adjustable resistance chain 165 and 166 together provide a constant current source for charging whichever of the capacitors 168 and 169 is switched into the circuit with a constant current whose magnitude is variable by adjusting the resistor 166. This in effect provides linear ramp charging of the selected capacitor. The transistor T3 is a field effect transistor which isolates the switched-in capacitor 168 or 169 from the emitter of the transistor T4 and provides current into the emitter of the transistor T4 when that transistor fires. A diode 172 shunting the field effect transistor T3 provides a low impedence path for discharge of the switched-in capacitor 168 or 169 through the transistor T4. The output from the timer circuit is taken across a load resistor 173 in the circuit of transistor T4 through an amplifier transistor T5 on to output line 140 which is shunted by a zener diode 174 which operates to clip the pulse height of the pulse from the timer circuit.

The input to the timer circuit from the logic inverter circuit 138 or 150 is on line 175 which is connected through a resistor 176 to a shunt resistor 177 which is connected to a negative voltage line 178 and then to an input 179 of a high gain differential amplifier 180 which is a commercially available integration circuit. The second input 181 of the amplifier 180 is connected through a resistor 182 to the zero volt line of the D.C. supply. The output line 183 from the amplifier 180 has a feedback loop through a diode 184 to the input line 179 and the output line 183 is connected through a blocking diode 185 to the gate of a further field effect transistor T2 which is connected across the switch 167 and the capacitors 168 and 169.

With the 0 level signal on line 175, the input 179 of differential amplifier 180 is slightly negative and below the voltage on input 181. In this condition the output of the amplifier tends to go positive but diode 184 conducts providing feedback to input 179 which holds the amplifier output small.

When the input on line 175 changes to 1 level, the input on line 179 to the amplifier 180 exceeds that on line 181 and the amplifier output goes negative. The diode 184 cannot conduct and there is therefore no feedback and the amplifier 180 saturates giving a large negative output.

With a small positive output on line 183, the diode 185 is nonconducting, and the transistor T2 is conducting. With a large negative output on line 183 the diode 185 is conducting and transistor T2 is non-conducting.

Thus the existence of a 0 level on line 175 through the circuits 180 to 185 renders the transistor T2 conductive thereby effectively short-circuiting and preventing any charging of the switched in capacitor 168 or 169. When the input on line 175 changes to 1 level, transistor T2 becomes non-conductive and the switched-in capacitor 168 or 169 commences charging according to the linear ramp charging characteristic determined by the circuit of the transistor T1. The slope of this ramp is set by the switch 167 and adjustment of the resistor 166 and at the preset time, which has been so set into the timer circuit, corresponding to the time interval $b$, the charge on the switched in capacitor reaches a level at which rapid discharge commences through transistor T4 thereby producing a negative-going output pulse on line 140 at the preset time after the change of the input signal on line 175 to the 1 level. The output pulse on line 140 as already described initiates further operation of the inhibit circuit to commence the next time period of switching of full wave rectified alternating current on line 46 to the electrode bar 31.

The maximum mean current from the switched current supply circuit on line 46 is of the order of 100 amps at 250 volts with peaks of the order of 1000A, and the output voltage is controlled by controlling the A.C. supply voltage at the terminals 44 and 45.

Some patterned float glass products produced by the method of the invention are illustrated in FIG. 16 to 20. In each of these examples, carried out on an experimental float plant, a ribbon of float glass 7 mm thick and 33 cm wide was produced and advanced along the bath at a speed of 45 meters per hour.

The electrode bar 31 was a shaped copper bar 30 cm wide in the direction transversely of the ribbon, and had a maximum length of 50 mm in the direction of ribbon advance. The glass temperature was about 750° C in the region where the bar 31 was located, and a protective atmosphere of 10% hydrogen, 90% nitrogen was maintained at a plenum over the bath.

In each example of FIGS. 16 to 20 the molten metal body 37 consisted of 2.5% copper and 97.5% lead; the time period of each applied burst of full wave rectified alternating current was 0.1 sec., and the pulse height was 54 volts.

Figure 16:
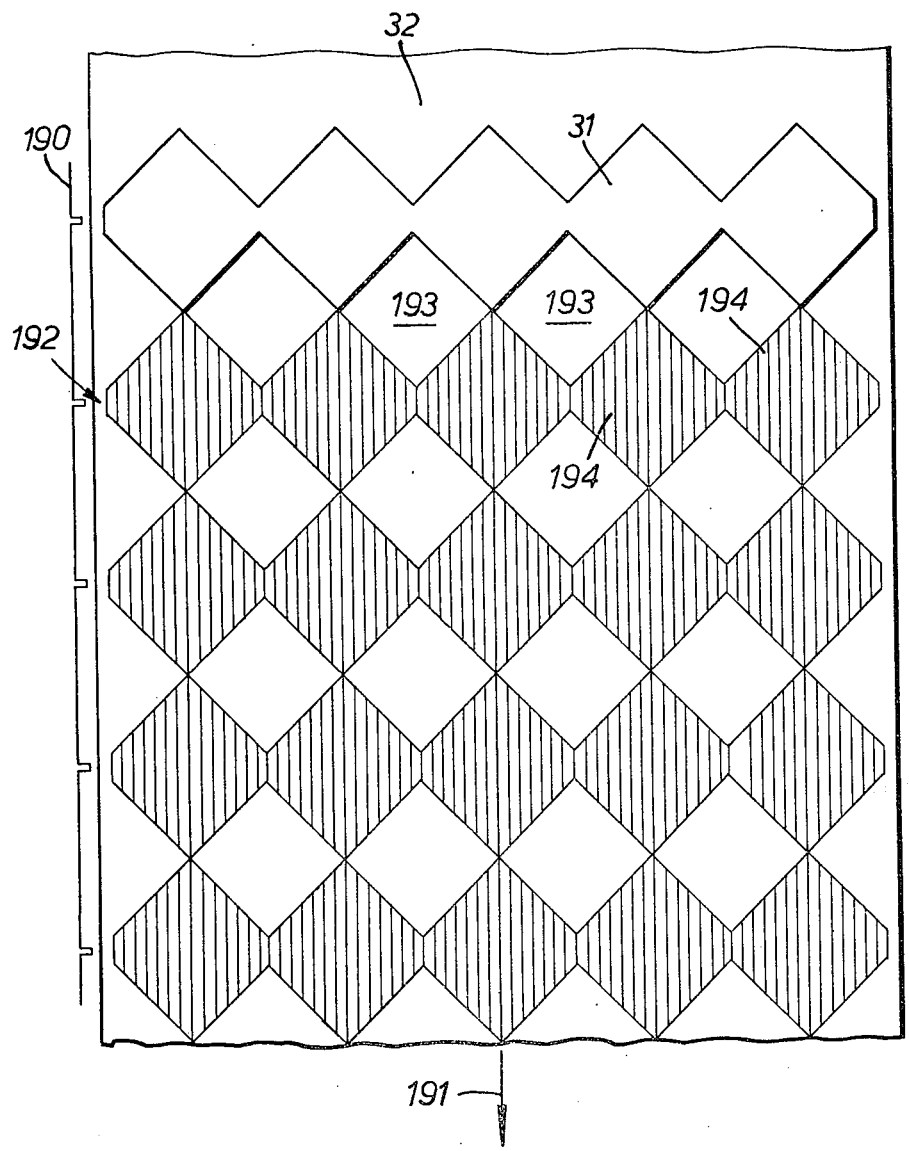
FIG. 16 is a plan view showing the locating member of FIG. 3 and a pattern of contiguous pattern elements introduced into the glass in one way of operating.

In FIG. 16 the ribbon of glass 32 is shown advancing in the direction of arrow 191 beneath the electrode bar 31 of FIG. 3 whose underface comprises a series of end-to-end hexagons. The switching waveform is indicated at 190 and comprises a train of equi-spaced time periods. That is the switching circuits are adjusted so that the time intervals $b$ and $c$ are equal.

Each time period of application of switched current is 0.1 sec. and the time interval between successive ON periods 4 seconds. This is also the time taken for an increment of the ribbon length, accommodating a pattern element to pass beneath the electrode bar 31. Thus current is applied to the bar 31 just as the trailing points of the hexagons of the previous pattern element 192 introduced into the glass surface, emerge from beneath the bar.

The modification of the glass surface is thus a repetitive series of contiguous patterns in which the shape of the molten metal body 37 and the underface of the locating member 31 is closely discernable. The patterned effect in the glass is made up of areas 193 of untreated clear glass having a visible light transmission of 80%, and grey coloured pattern areas 194 having a visible light transmission of 65%. Interference colours are visible in light reflected from the patterned surface of the glass, notably yellow and blues. FIG. 16 clearly shows how each of the contiguous patterns in the glass surface clearly exihibits its derivation from the configuration of the molten metal body 37.

Figure 17:
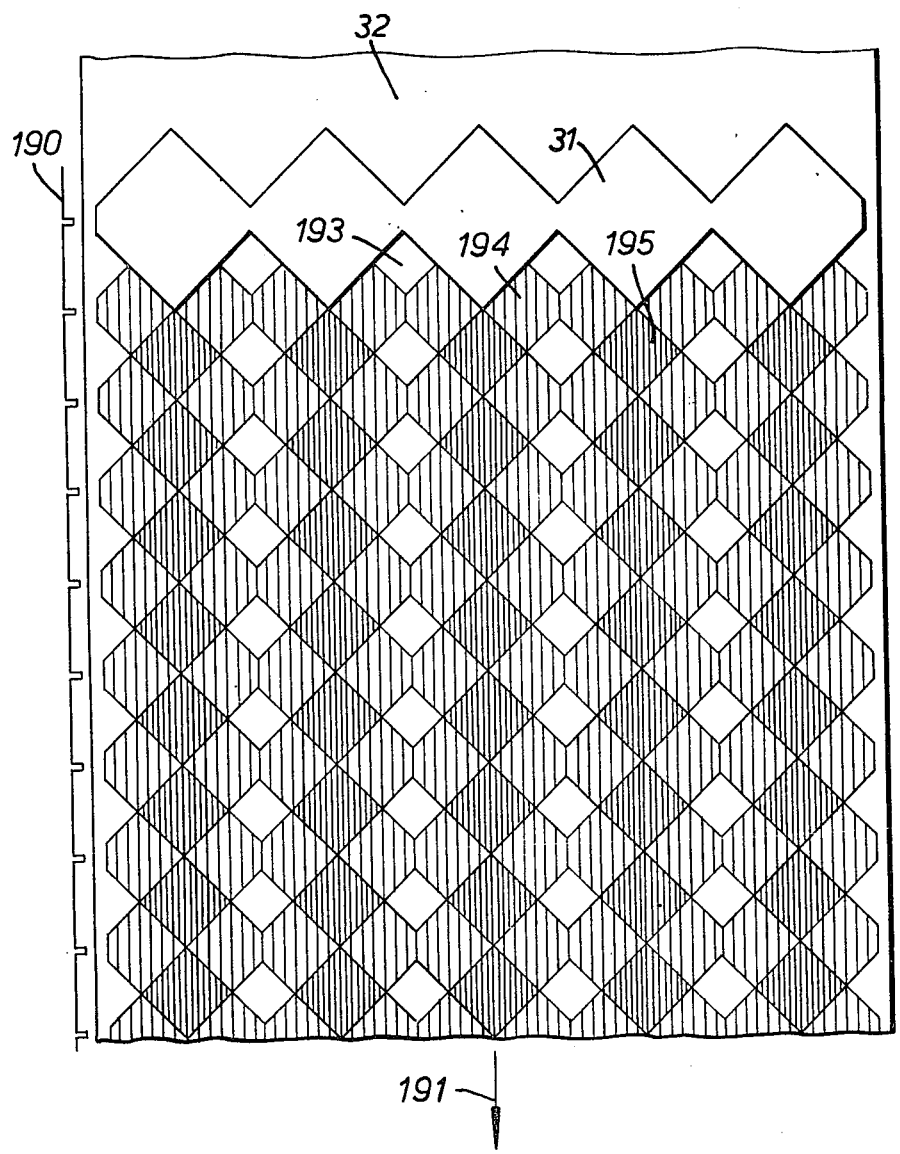
FIG. 17 is a view similar to FIG. 16 showing overlapping pattern elements introduced into the glass.

The effect of shortening the time interval to 2 seconds between adjacent 0.1 sec. current bursts is shown in FIG. 17. The switching waveform is indicated at 190.

Pattern elements overlap regularly and the resulting complex decoration consists of clear areas 193 of untreated glass, grey coloured areas 194, and bronze coloured areas 195 in which the visible light transmission is 55%. Colours in the treated surface viewed in reflected light also show the more complex pattern.

Figure 18:
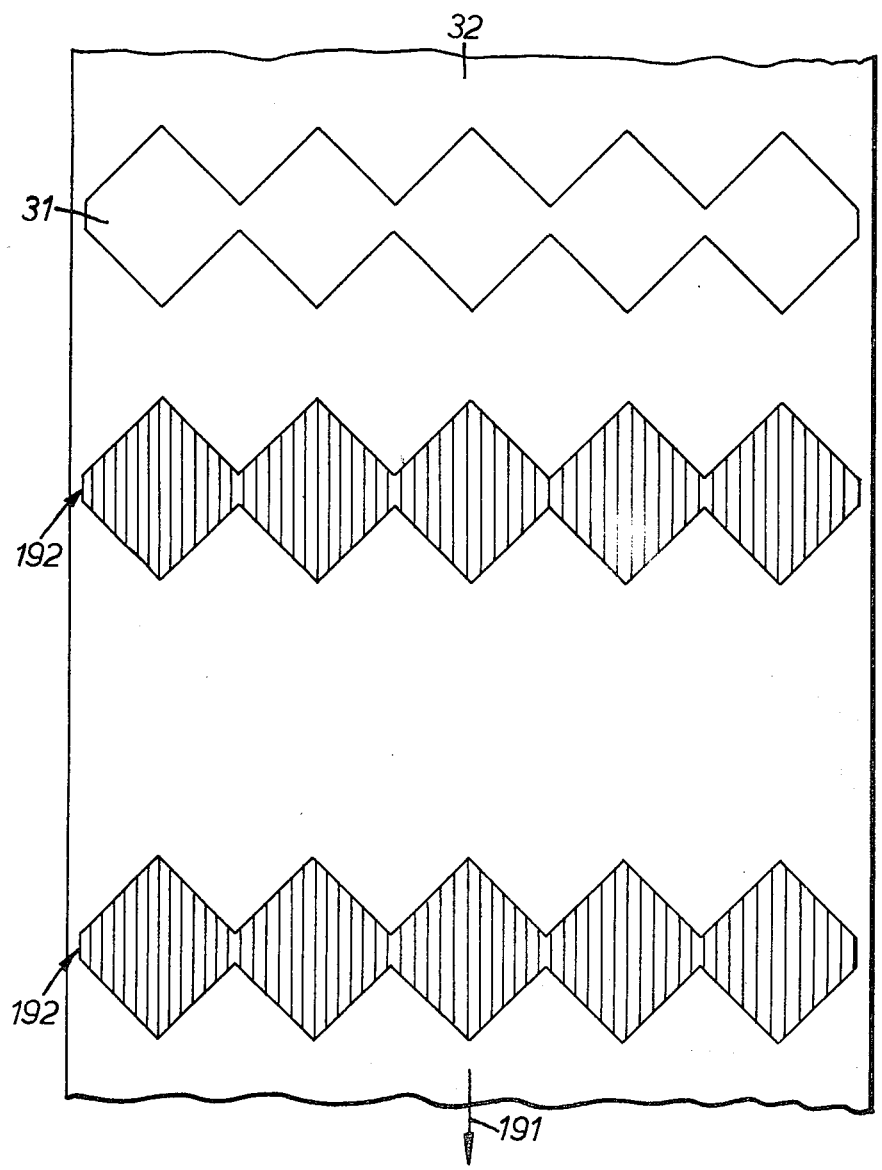
FIG. 18 is a view similar to FIG. 16 showing spaced-apart pattern elements introduced into the glass.

The time intervals between the application of pattern elements may be increased, as illustrated in FIG. 18, so that the pattern elements are spaced apart in the direction of advance of the ribbon.

Figure 19:
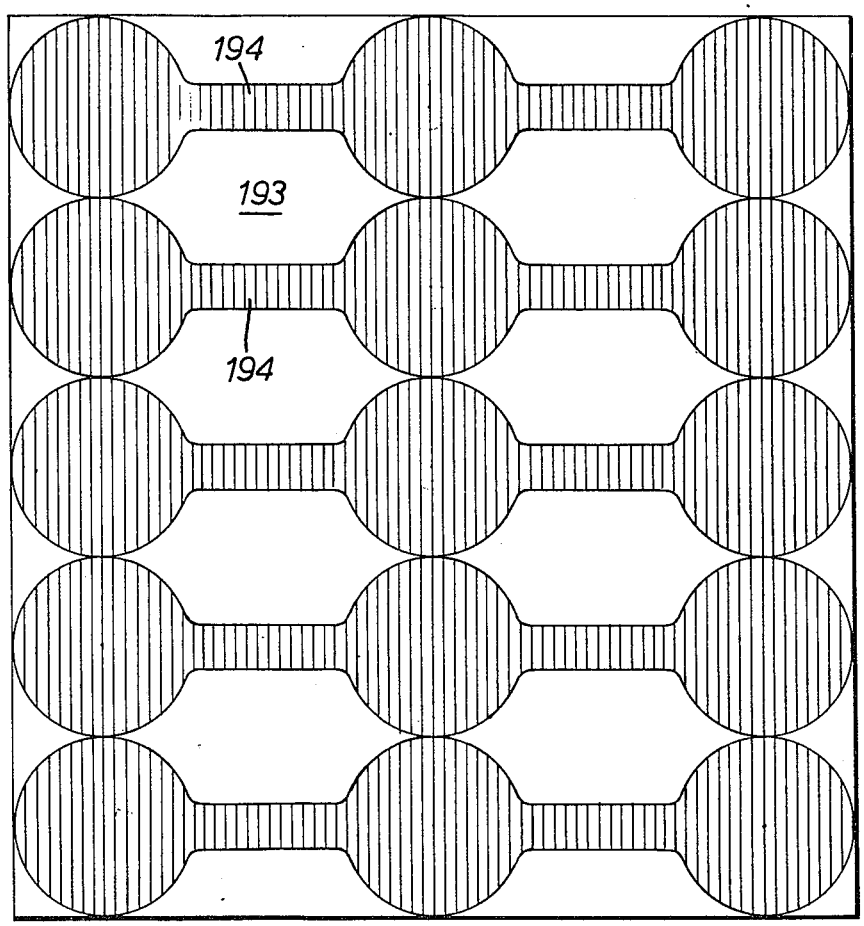
FIG. 19 illustrates contiguous pattern elements introduced into the glass using the locating member of FIG. 4.
Figure 20:
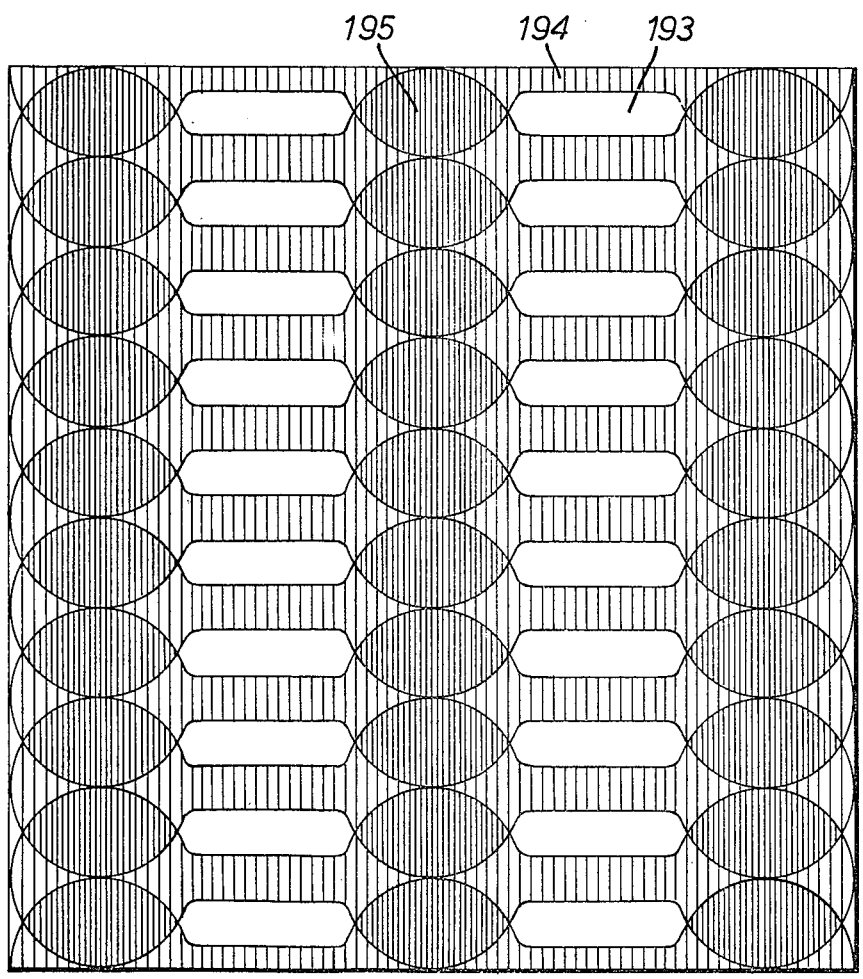
FIG. 20 illustrates overlapping pattern elements introduced into the glass using the locating member of FIG. 4.

FIGS. 19 and 20 illustrate patterns produced in the glass using the electrode bar of FIG. 4. In FIG. 19 simple contiguous pattern elements introduced into the glass result in clear areas 193 with a transmission of 80% exist between grey coloured areas 194 with a transmission of 65%.

In FIG. 20 the more complex pattern of overlapping pattern elements produced when the time between pulses is halved includes bronze areas 195 whose visible light transmission is 55%.

Figure 21:
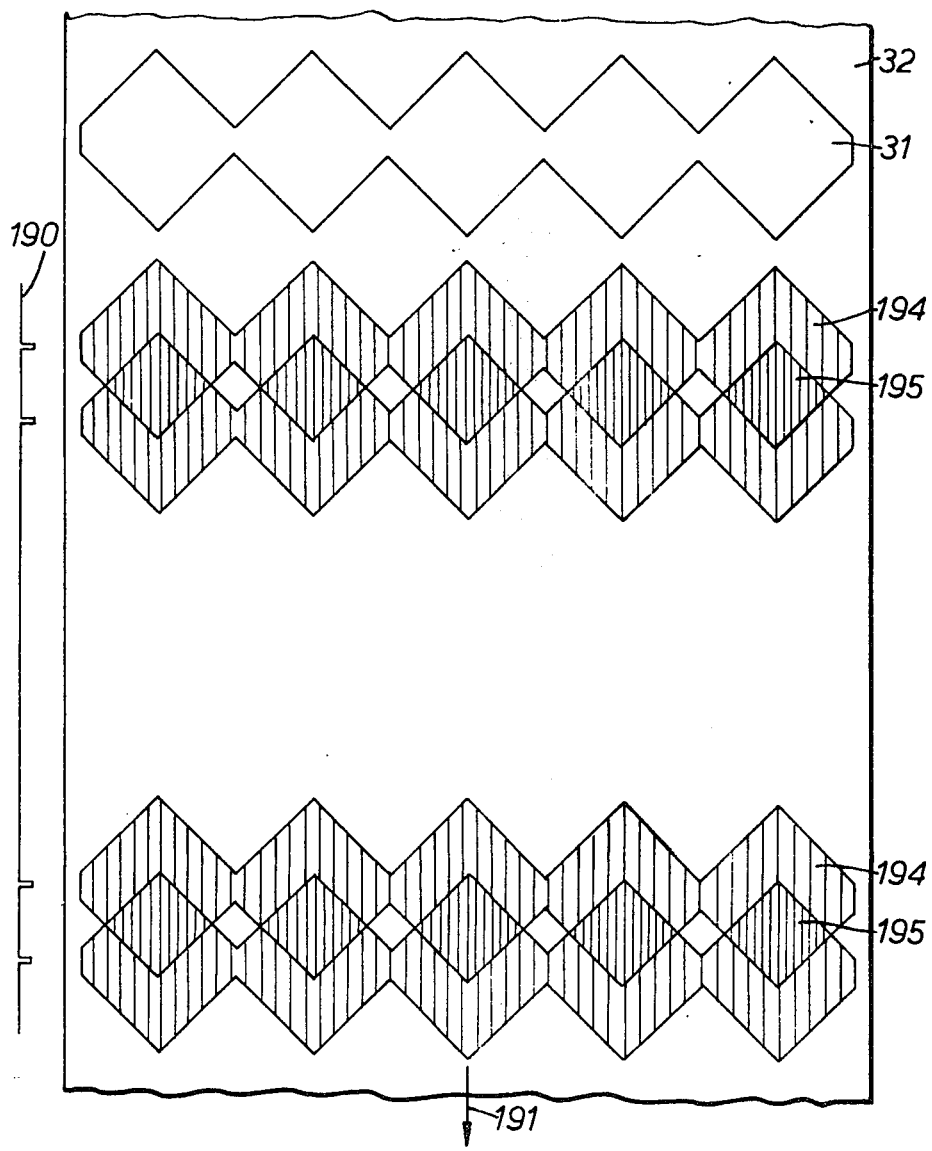
FIG. 21 is a view similar to FIG. 16, showing the locating member of FIG. 3 and a pattern of spaced-apart groups of two overlapping pattern elements.

FIG. 21 illustrates operation of the method, using the shaped bar of FIG. 3, with current switching time periods of equal duration and different time intervals $b$ and $c$ between successive defined time periods. The switching waveform is indicated at 190 and results in a pattern consisting of two overlapping pattern elements followed by clear glass and two further overlapping pattern elements. The overlapping of the pattern elements result in areas 194 and 195 having different light transmission such as also exist in the pattern of FIG. 17.

Figure 22:
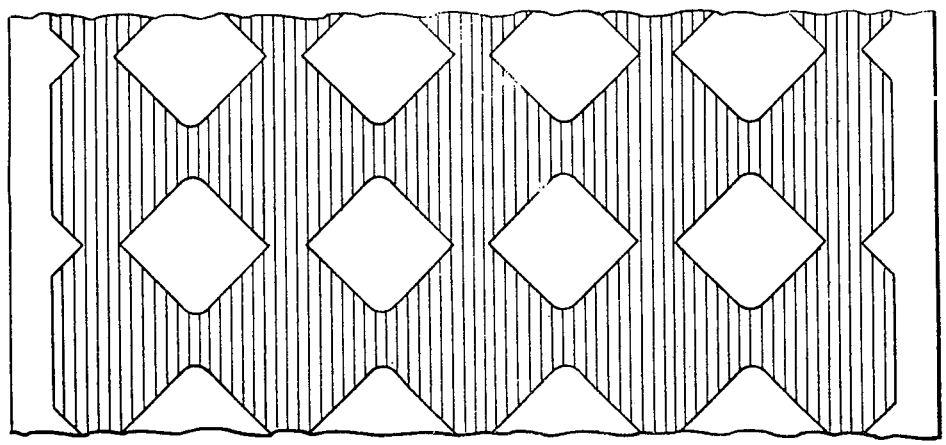
FIG. 22 illustrates a pattern of contiguous pattern elements produced with the locating member of FIG. 6.
Figure 23:
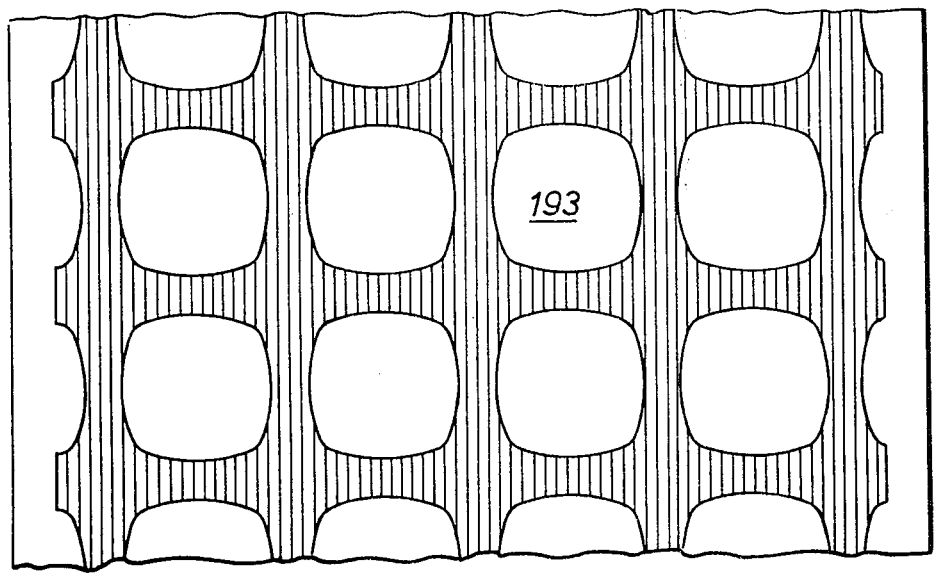
FIG. 23 illustrates a pattern of contiguous pattern elements produced with the locating member of FIG. 9.

A pattern of contiguous pattern elements introduced into the glass from a bar 31 whose underface is shaped to the configuration illustrated in FIG. 6, is shown in FIG. 22. FIG. 23 illustrates a pattern of continguous pattern elements produced using a bar shaped as in FIG. 9. The clear spaces 193 in the pattern are shaped similarly to a television viewing screen.

Figure 24:
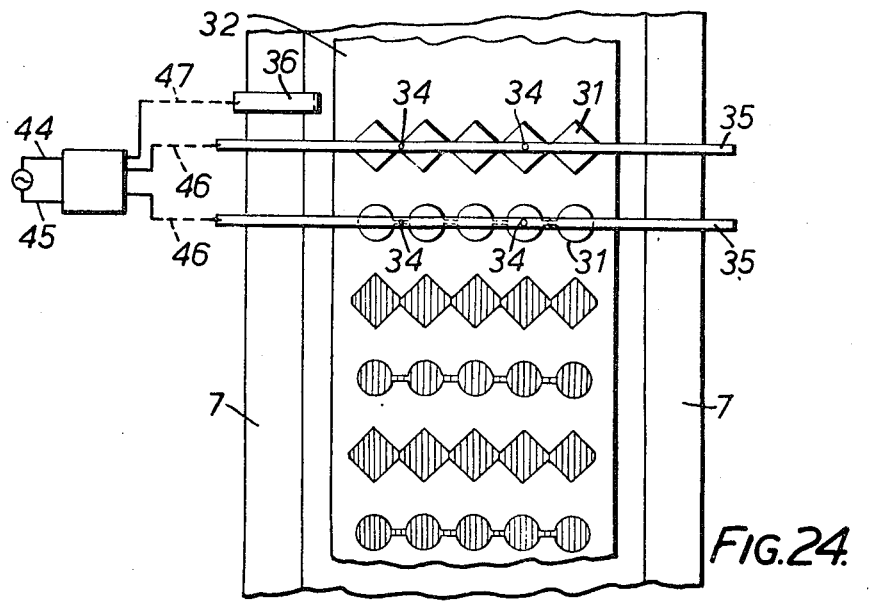
FIG. 24 is a view similar to part of FIG. 2, illustrating the use of two locating members of different shapes.

In the embodiment of FIG. 24 two shaped locating members 31 are used which each extend across the ribbon width and which members 31 are spaced apart in the direction of glass advance. The underfaces of the locating members are respectively shaped as illustrated in FIGS. 3 and 4.

Each locating member 31 is suspended from an electrically conductive beam 35 and the beams are individually connected as shown to the electric current supply circuit. Current may be supplied to both beams 35 simultaneously to produce a pattern as indicated with different pattern elements alternating, and the individual current supply permits other switching sequences to introduce desired combinations of pattern elements into the glass either overlapping, contiguous or spaced apart by a predetermined distance.

Figure 25:
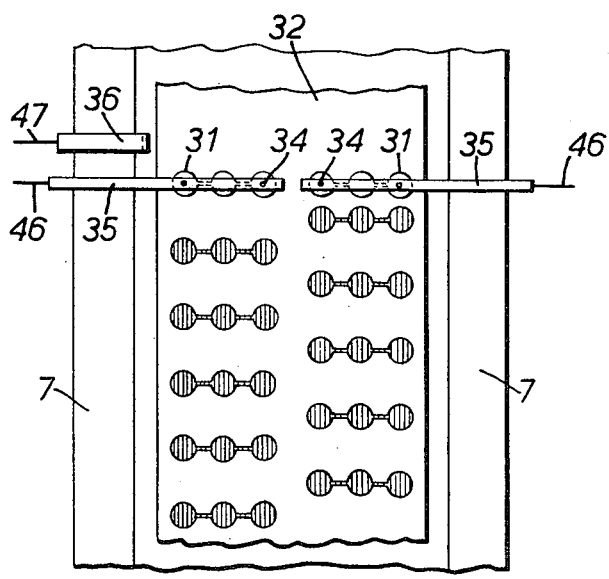
FIG. 25 is a view similar to FIG. 24 showing the use of two short locating members aligned across a ribbon of glass.

Another arrangement of two locating members 31 is shown in FIG. 25. Both are short members whose underface configuration is as shown in FIG. 4 and the two members 31 are suspended from separate beams 35 which are mounted end-to-end over the bath surface by the struts 35.

Each locating member 31 extends over half the ribbon width and the gap between the inner ends of the two members is sufficient to ensure electrical isolation from each other.

Figure 26:
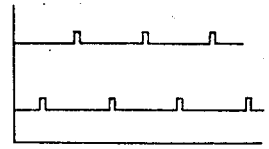
FIG. 26 is a waveform diagram illustrating the switching of current to the embodiment of FIG. 25.

Individual connections 46 to the switched current supply circuits permit the energisation of the two members 31 or in out-of-phase switching sequences indicated by the waveforms of FIG. 26, resulting in the stepped pattern shown in FIG. 25.

When a number of isolated molten bodies are being used, for example as in FIGS. 24 and 25, random switching of bursts of rectified alternating current may be used to produce random decorative effects, for example a pattern consisting of a number of pattern elements randomly distributed over the glass surface.

The reducing atmosphere in the headspace over the bath, to which the patterned glass surface is exposed as it moves from beneath the molten body or bodies 37, assists development of colours in the glass surface.

Other molten metals or alloys may be used for producing coloured patterns in the glass; for example the electrode bar 31 and the molten body 37 may be of materials as indicated in the following table which also indicates the preferred glass temperature beneath the molten body and the colour (in respect of transmitted light) achieved by use of the respective molten body:

ply resulting in a striped background in the glass on which are superimposed the pattern elements produced by the bursts of alternating current supply which are switched from that background level.

The electrical supply may be direct current, alternating current, or whole wave or half wave rectified alternating current. The supply may be of fixed or variable amplitude and switching between different amplitude levels may be achieved by switching between different supply sources. The switching may be automatically controlled. For example the production of a complex pattern may be by programmed switching using a general purpose or special purpose computer or a programmed electrical actuator such as a tape controller.

For application of the process to the production of patterned glass at higher speeds than those referred to above for example speeds up to 200 or 300 meters per hour the definition of the patterns applied to the glass to produce the decorative finish may not be as good as in the examples illustrated for slower speed operation. This is because the glass surface being treated by ionic migration from the molten body into the glass may hae moved for some appreciable distance below that molten body in the defined time period. The result may still be a pleasing decorative effect in which a pattern of modified glass is produced in the glass surface which pattern still exhibits its derivation from the configuration of the molten body which configuration is progenitive of the whole decorative effect achieved in the glass.

The invention may be applied to the production of patterned glass articles for example patterned sheets of glass which are individually treated by the method according to the invention or shaped glass for example

| Electrode bar | Molten Body | Preferred Temp. | Body Composition | Transmission Colour |
| --- | --- | --- | --- | --- |
| Copper | Copper/bismuth | 700° C | 8% Cu 92% Bi | Pink |
| Silver | Silver/Bismuth | 650° C | 62% Ag 38% Bi | Yellow |
| Cobalt | Cobalt/Bismuth | 850° C | 3% Co 97% Bi | Blue (ionic colour) |
| Nickel | Nickel/Bismuth | 800° C | 9% Ni 91% Bi | Brown |
| Ruthenium | Lead | 750° C | 100% Pb | Grey |
| Iron (mild steel) | Indium | 650°–750° C | 100% In | Amber |

When two molten bodies are used, those bodies and their locating electrode bars may be of different materials, giving additional diversity of decorative effect.

The last Example given in the above table is indium which can give a range of transmission colours other than amber when the time period of application of switched anodic current is below about 100 ms and the white light transmission is greater than about 50%. This is because of interference effects and high reflectivities in certain parts of the visible spectrum.

Indium treatments can yield pink, green and yellow transmission colours and blue, pink, yellow and green reflection colours. All these colours can be present in the patterns due to differences in current density which may be present across the electrode, and differences in the degree of treatment.

The electric current supply to the molten body or bodies may include a background level of current supstructural glass elements shaped to a U-shaped profile. Additionally the invention may be applied to the decoration of glassware in which there is relative movement between a surface of glassware to be decorated and a shaped molten body according to the invention.

We claim:

1. Patterned glass having patterned surface modification produced by a process comprising locating in contact with the surface of the glass which is at a temperature at which it is electrically conductive, a molten body of an electrically conductive material for modifying the glass which body is shaped to a configuration progenitive of a pattern to be introduced into the glass, effecting relative movement between the shaped molten body and the glass, connecting an electrical supply to the molten body and to the glass, and switching that supply to engender electrically a predetermined ionic migration between the molten body and the glass in a time period during said relative movement, said time period being defined by a supply pulse width of the switched supply which is related to the speed of said relative movement and is sufficient to produce a pattern element of modified glass in said glass surface which pattern element exhibits its derivation from the configuration of the molten body.

2. Patterned glass according to claim 1, having pattern elements of modified glass in said glass surface formed by zones of different light transmission properties which are cyclically repetitive in the direction of said relative movement, produced by switching said supply in a succession of said time periods.

3. Patterned flat glass according to claim 2, having a repetitive series of pattern elements of coloured glass, which pattern elements define between them areas of untreated clear glass.

4. Patterned flat glass according to claim 3, wherein the pattern elements of coloured glass have a visible light transmission of from about 55 percent to about 65 percent, and the areas of untreated clear glass have a visible light transmission of about 80 percent.

5. Patterned flat glass according to claim 4, wherein each said pattern element comprises copper and lead in the glass surface producing a grey colour, and has a visible light transmission of about 65 percent.

6. Patterned flat glass according to claim 4, wherein each said pattern element is coloured by indium in the glass surface and has a white light transmission greater than about 50 percent.

7. Patterned flat glass according to claim 3, having a repetitive series of overlapping pattern elements which define areas of untreated clear glass having a visible light transmission of about 80 percent, singly-treated pattern areas having a visible light transmission of about 65 percent and overlapping doubly-treated pattern areas having a visible light transmission of about 55 percent.

8. Patterned flat glass according to claim 7, wherein said pattern elements comprise copper and lead in the glass surface producing grey coloured singly-treated pattern areas having a visible light transmission of about 65 percent and bronze coloured doubly-treated pattern areas having a visible light transmission of about 55 percent.

9. Patterned flat glass according to claim 2, having a repetitive series of pattern elements of coloured glass which pattern elements define between them areas of glass untreated by electrolytic migration.

10. Patterned flat glass according to claim 9, having a surface concentration of copper and lead produced by electrolytic migration of copper and lead into that surface from a shaped molten body of copper/lead alloy, and wherein said repetitive series of pattern elements of coloured glass comprise singly-treated pattern areas in which the copper and lead in the glass surface produce a grey colour in transmitted light.

11. Patterned flat glass according to claim 9, having a surface concentration of copper and lead produced by electrolytic migration of copper and lead into that surface from a shaped molten body of copper/lead alloy, and wherein said repetitive series of pattern elements of coloured glass comprise singly-treated and doubly-treated pattern areas in which the copper and lead in the glass surface produce a grey colour in transmitted light in the singly-treated areas and a bronze colour in transmitted light in the doubly-treated areas.

12. Patterned flat glass according to claim 9, having a surface concentration of copper and bismuth produced by electrolytic migration of copper and bismuth into that surface from a shaped molten body of copper/bismuth alloy, and wherein said repetitive series of pattern elements of coloured glass comprise copper and bismuth in the glass surface which produce a pink colour in transmitted light.

13. Patterned flat glass according to claim 9, having a surface concentration of silver and bismuth produced by electrolytic migration of silver and bismuth into that surface from a shaped molten body of silver/bismuth alloy, and wherein said repetitive series of pattern elements of coloured glass comprises silver and bismuth in the glass surface which produce a yellow colour in transmitted light.

14. Patterned flat glass according to claim 9, having a surface concentration of cobalt and bismuth produced by electrolytic migration of cobalt and bismuth into that surface from a shaped molten body of cobalt/bismuth alloy, and wherein said repetitive series of pattern elements of coloured glass comprise cobalt and bismuth ions in the glass surface which produce a blue colour in transmitted light.

15. Patterned flat glass according to claim 9, having a surface concentration of nickel and bismuth produced by electrolytic migration of nickel and bismuth into that surface from a shaped molten body of nickel/bismuth alloy, and wherein said repetitive series of pattern elements of coloured glass comprise nickel and bismuth in the glass surface which produce a brown colour in transmitted light.

16. Patterned flat glass according to claim 9, having a surface concentration of lead produced by electrolytic migration of lead into that surface from a shaped body of molten lead, and wherein said repetitive series of pattern elements of coloured glass comprise pattern elements of lead which produces a grey colour in transmitted light.

17. Patterned flat glass according to claim 9, having a surface concentration of indium produced by electrolytic migration of indium into that surface from a shaped body of molten indium, and wherein said repetitive series of pattern elements of coloured glass comprise pattern elements of indium which produces an amber colour in transmitted light.

18. A glass sheet according to claim 2, in which the pattern is cyclically repetitive in a direction orthogonal to said one direction.

19. A glass sheet according to claim 2, wherein the repetitions of a pattern element are contiguous.

20. A glass sheet according to claim 2, wherein the repetitions of a pattern element overlapp.

21. A glass sheet according to claim 2, wherein the repetitions of a pattern element are spaced apart.

22. A glass sheet according to claim 2, wherein the pattern includes at least two pattern elements of different shapes.

23. Flat glass having a repeated pattern comprising areas of untreated clear glass and coloured pattern areas produced by a process comprising locating in contact with a surface of the glass which is at a temperature at which it is electrically conductive, a molten alloy body which is shaped to a configuration progenitive of said coloured pattern areas to be introduced into the glass, effecting relative movement between the shaped molten alloy body and the glass surface, connecting an electrical supply to the molten alloy body and to the glass, repeatedly switching current from said electrical supply to engender electrically a predetermined ionic migration of metals of the alloy into the glass surface in a succession of time periods during said relative movement, said time periods being defined by the widths of supply pulses of the switched supply which are related to the speed of said relative movement and are sufficient to produce said coloured pattern areas in the glass surface, each of which pattern areas exhibits its derivation from the configuration of the molten alloy body.

24. Flat glass having a repeated pattern comprising areas of glass untreated by electrolytic migration and coloured pattern areas produced by a process comprising locating in contact with a surface of the glass which is at a temperature at which it is electrically conductive, a molten alloy body which is shaped to a configuration progenitive of said coloured pattern areas to be introduced into the glass, effecting relative movement between the shaped molten alloy body and the glass surface, connecting an electrical supply to the molten body and to the glass, repeatedly switching current from said electrical supply to engender electrically a predetermined ionic migration of metals of the alloy into the glass surface in a succession of time periods during said relative movement, said time periods being defined by the widths of supply pulses of the switched supply which are related to the speed of said relative movement and are sufficient to produce said coloured pattern areas in the glass surface, each of which pattern areas exhibits its derivation from the configuration of the molten alloy body.

25. Patterned flat glass according to claim 24, having a surface concentration of copper and lead produced by electrolytic migration of copper and lead into that surface from a shaped molten body of copper/lead alloy, which concentration varies according to a repetitive series of coloured pattern areas comprising singly-treated pattern areas whose configuration is derived from the shape of the molten alloy body and in each of which pattern areas the copper and lead in the glass surface produce a grey colour in transmitted light.

26. Patterned flat glass according to claim 24, having a surface concentration of copper and lead produced by electrolytic migration of copper and lead into that surface from a shaped molten body of copper/lead alloy, which concentration varies according to a repetitive series of coloured pattern areas whose configuration is derived from the shape of the molten alloy body, which pattern areas comprise singly-treated pattern areas in which the copper and lead in the glass surface produce a grey colour in transmitted light, and doubly-treated pattern areas in which the copper and lead in the glass surface produce a bronze colour in transmitted light.

27. Patterned flat glass according to claim 24, having a surface concentration of copper and bismuth produced by electrolytic migration of copper and bismuth into that surface from a shaped molten body of copper/bismuth alloy, which concentration varies according to a repetitive series of coloured pattern areas whose configuration is derived from the shape of the molten alloy body and in each of which pattern areas copper and bismuth in the glass surface produce a pink colour in transmitted light.

28. Patterned flat glass according to claim 24, having a surface concentration of silver and bismuth produced by electrolytic migration of silver and bismuth into that surface from a shaped molten body of silver/bismuth alloy, which concentration varies according to a repetitive series of coloured pattern areas whose configuration is derived from the shape of the molten alloy body and in each of which pattern areas silver and bismuth in the glass surface produce a yellow colour in transmitted light.

29. Patterned flat glass according to claim 24, having a surface concentration of cobalt and bismuth ions produced by electrolytic migration of cobalt and bismuth into that surface from a shaped molten body of cobalt/bismuth alloy, which concentration varies according to a repetitive series of coloured pattern areas whose configuration is derived from the shape of the molten alloy body and in each of which pattern areas cobalt and bismuth ions in the glass surface produce a blue colour in transmitted light.

30. Patterned flat glass according to claim 24, having a surface concentration of nickel and bismuth produced by electrolytic migration of nickel and bismuth into that surface from a shaped molten body of nickel/bismuth alloy, which concentration varies according to a repetitive series of coloured pattern areas whose configuration is derived from the shape of the molten alloy body and in each of which pattern areas nickel and bismuth in the glass surface produce a brown colour in transmitted light.

31. Patterned flat glass according to claim 2, having a surface concentration of lead produced by electrolytic migration of lead into that surface from a shaped molten lead body, which concentration varies according to a repetitive series of pattern elements of coloured glass whose configuration is derived from the shape of the body of molten lead and in each of which pattern elements lead in the glass surface produces a grey colour in transmitted light.

32. Patterned flat glass according to claim 2, having a surface concentration of indium produced by electrolytic migration of indium into that surface from a shaped body of molten indium, which concentration varies according to a repetitive series of pattern elements of coloured glass whose configuration is derived from the shape of the body of molten indium and in each of which pattern elements indium in the glass surface produces an amber colour in transmitted light.

33. Patterned flat glass according to claim 2, having a surface concentration of indium produced by electrolytic migration of indium into that surface from a shaped body of molten indium, which concentration varies according to a repetitive series of pattern elements of indium whose configuration is derived from the shape of the molten indium body.

34. Patterned flat glass according to claim 2, having a surface concentration of indium produced by electrolytic migration of indium into that surface from a shaped body of molten indium followed by exposure of the glass to a reducing atmosphere, which concentration varies according to a repetitive series of pattern elements of indium whose configuration is derived from the shape of the molten indium body and which have an amber colour in transmitted light.

35. Patterned glass according to claim 1, having a surface concentration of reduced metal produced by ionic migration of at least one metal from a shaped body of molten metal into the glass which migration is engendered electrically in a succession of said time periods during said relative movement between the molten metal body and the glass, followed by reduction of metal ions in the glass, which surface concentration varies repetitively according to a defined pattern derived from the shape of the molten metal body.

36. Patterned flat glass according to claim 1, having a surface concentration of reduced metal produced by ionic migration of at least one metal from a shaped body of molten metal into the glass which migration is engendered electrically in a succession of said time periods during relative movement between the molten metal body and the glass, followed by reduction of metal ions in the glass, which surface concentration varies repetitively according to a repetitive series of pattern elements of coloured glass whose configuration is derived from the shape of the molten metal body and which define between them areas of untreated clear glass.

* * * * *